United States Patent
In et al.

(10) Patent No.: US 9,697,007 B2
(45) Date of Patent: Jul. 4, 2017

(54) DISPLAY APPARATUS AND CONTROL METHOD THEREOF

(71) Applicant: SAMSUNG ELECTRONICS CO., LTD., Suwon-si (KR)

(72) Inventors: Woo Sung In, Hwaseong-si (KR); Il Ki Min, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 14/818,766

(22) Filed: Aug. 5, 2015

(65) Prior Publication Data

US 2016/0055006 A1 Feb. 25, 2016

(30) Foreign Application Priority Data

Aug. 20, 2014 (KR) .......................... 10-2014-0108639
Nov. 7, 2014 (KR) .......................... 10-2014-0154809

(51) Int. Cl.
  *G06F 9/44* (2006.01)
  *G06F 3/0484* (2013.01)
(52) U.S. Cl.
  CPC .......... *G06F 9/4403* (2013.01); *G06F 3/0484* (2013.01); *G06F 9/4401* (2013.01)
(58) Field of Classification Search
  CPC .... G06F 9/4401; G06F 9/4403; G06F 9/4411; G06F 3/0484
  See application file for complete search history.

(56) References Cited

U.S. PATENT DOCUMENTS

| 6,401,202 | B1 * | 6/2002 | Abgrall ................. G06F 9/445 713/2 |
| 2003/0107562 | A1 | 6/2003 | Shin et al. |
| 2010/0141605 | A1 * | 6/2010 | Kang ................... G06F 1/1626 345/174 |
| 2011/0134145 | A1 | 6/2011 | Moriwaki |
| 2013/0207946 | A1 * | 8/2013 | Kim ..................... G09G 3/3225 345/204 |

FOREIGN PATENT DOCUMENTS

| KR | 10-2013-0092868 A | 8/2013 |
| KR | 10-2014-0025923 A | 3/2014 |
| WO | 2013/094866 A1 | 6/2013 |

OTHER PUBLICATIONS

International Search Report dated Nov. 23, 2015, issued by the International Searching Authority in counterpart International Application No. PCT/KR2015/007693 (PCT/ISA/210).

* cited by examiner

*Primary Examiner* — Dennis M Butler
(74) *Attorney, Agent, or Firm* — Sughrue Mion, PLLC

(57) ABSTRACT

A display apparatus and method for bending a display panel automatically during booting are provided. According to an exemplary embodiment, the display apparatus may include a display module; an input unit configured to receive a command from a user; a storage configured to store a booting sequence; a driver configured to change a curvature of the display module; and a processor configured to, in response to a power-on command being received through the input unit, control the driver to bend the display module, while performing booting according to the booting sequence.

20 Claims, 49 Drawing Sheets

DISPLAY APPARATUS AND CONTROL METHOD THEREOF

CROSS-REFERENCE TO RELATED APPLICATIONS

This application claims priority from Korean Patent Application No. 10-2014-0108639, filed on Aug. 20, 2014, and Korean Patent Application No. 10-2014-0154809, filed on Nov. 7, 2014, in the Korean Intellectual Property Office, the entire disclosures of which are incorporated herein by reference.

BACKGROUND

1. Field

Apparatuses and methods consistent with exemplary embodiments relate to a display apparatus for displaying images on a screen, and a control method thereof.

2. Description of Related Art

In general, a display apparatus may include a display panel on which images are displayed. For example, the display apparatus may be a television, a monitor, and the like.

A typical display apparatus includes a relatively flat display panel. However, recently a display apparatus with a curved display panel has been developed.

When viewing two-dimensional (2D) images through a display apparatus with a curved display panel, a user may experience a three-dimensional (3D) effect as if seeing 3D images. Also, a display apparatus with a curved display panel may increase a user's sense of immersion.

However, typically a display apparatus includes only a flat panel display or a curved display, but not both. Furthermore, the process of bending or curving a display panel can be dangerous because the panel can break during the bending process. Also, the bending process can be time consuming.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments of the present disclosure provide a display apparatus which is capable of changing a curvature of a display panel automatically during booting, and a method of controlling the display apparatus.

Additional aspects of the disclosure are set forth in part in the description which follows and, in part, are obvious from the description, or may be learned by practice of one or more of the exemplary embodiments.

According to an aspect of an exemplary embodiment, provided is a display apparatus including a display module; an input unit configured to receive a command from a user; a storage configured to store a booting sequence; a driver configured to change a curvature of the display module; and a processor configured to, in response to a power-on command being received through the input unit, control the driver to bend the display module while performing booting according to the booting sequence.

The display module may be a self-emitting display panel.

The display module may be a non-emissive display panel.

The storage may store a setting value representing whether to bend the display module during booting, and the processor may control the driver to bend the display module based on the setting value.

The booting sequence may include at least one of loading a Basic Input Output System (BIOS), initializing hardware of the display apparatus, loading a bootloader, executing an operating system (OS), loading a hardware driver, and executing an application.

The processor may transmit a booting control signal to hardware corresponding to the booting sequence, and transmit a bending control signal for bending the display module to the driver while transmitting the booting control signal to the hardware.

In response to a power-off command being received through the input unit, the processor may control the driver to change a curvature of the display module such that the display module is transformed to a flat state.

The processor may further include a graphic processor configured to control the display module to display a bending setting window for setting whether to change the curvature of the display module.

According to an aspect of another exemplary embodiment, provided is a method of controlling a display apparatus including receiving a power-on command; in response to the power-on command being received, booting according to a booting sequence stored in a storage; determining whether to bend a display module during booting based on a setting value stored in the storage; and in response to determining to bend the display module during booting, controlling the driver to bend the display module.

The method may further include displaying a bending setting window for setting whether to bend the display module.

The method may further include receiving an input for setting whether to bend the display module during booting, through the bending setting window; and storing a setting value corresponding to the input for setting whether to bend the display module during booting, in the storage.

The booting may include at least one of loading a Basic Input Output System (BIOS), initializing hardware of the display apparatus, loading a bootloader, executing an operating system (OS), loading a hardware driver, and executing an application.

The booting may include transmitting a booting control signal to hardware corresponding to the booting sequence; and performing, at the hardware receiving the booting control signal, booting according to the booting control signal.

The controlling of the driver may include transmitting a bending control signal for bending the display module to the driver, while transmitting the booting control signal to the hardware.

The control method may further include, in response to a power-off command being received, controlling the driver to change a curvature of the display module such that the display module is transformed to a flat state.

BRIEF DESCRIPTION OF THE DRAWINGS

These and/or other aspects of the disclosure will be apparent and more readily appreciated from the following description of the exemplary embodiments, taken in conjunction with the accompanying drawings, in which.

DETAILED DESCRIPTION

Figure 1A:
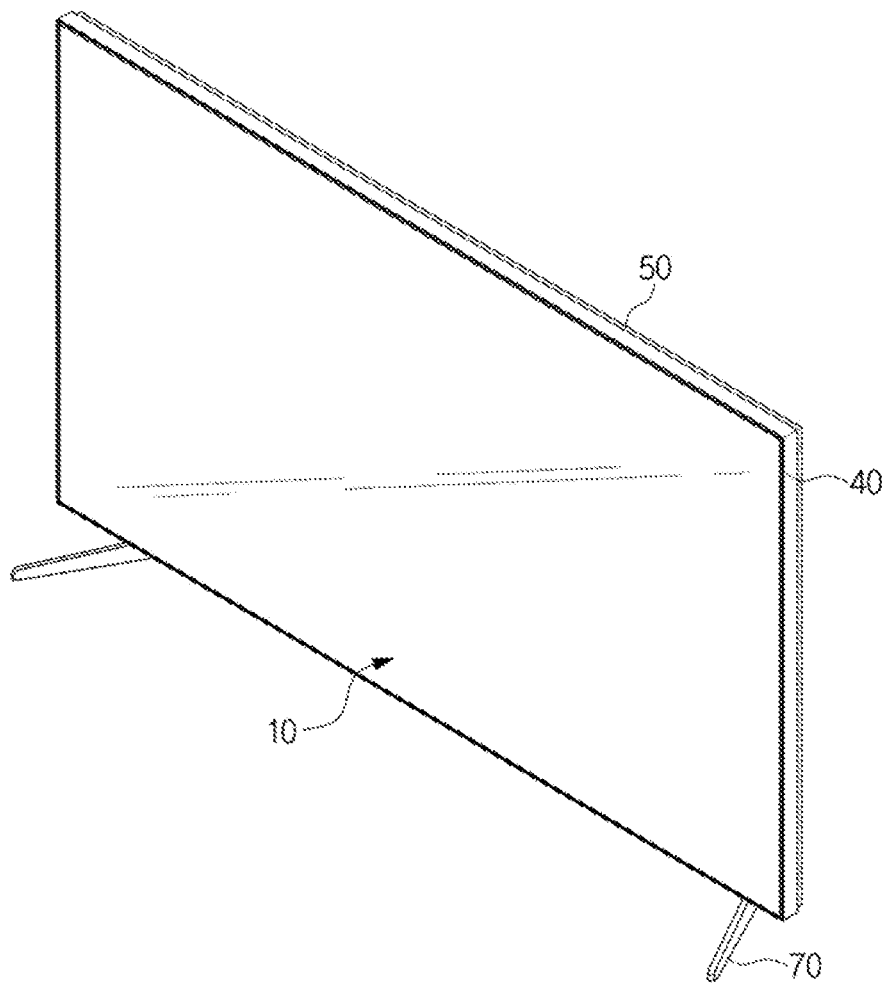
FIG. 1A is a diagram illustrating a display apparatus when a display module is in a flat state, according to an exemplary embodiment.

Reference will now be made o the exemplary embodiments of the present disclosure, examples of which are illustrated in the accompanying drawings, wherein like reference numerals should be understood to refer to like elements throughout. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, examples of a display apparatus and a control method thereof are described with reference to the appended drawings.

Figure 1B:
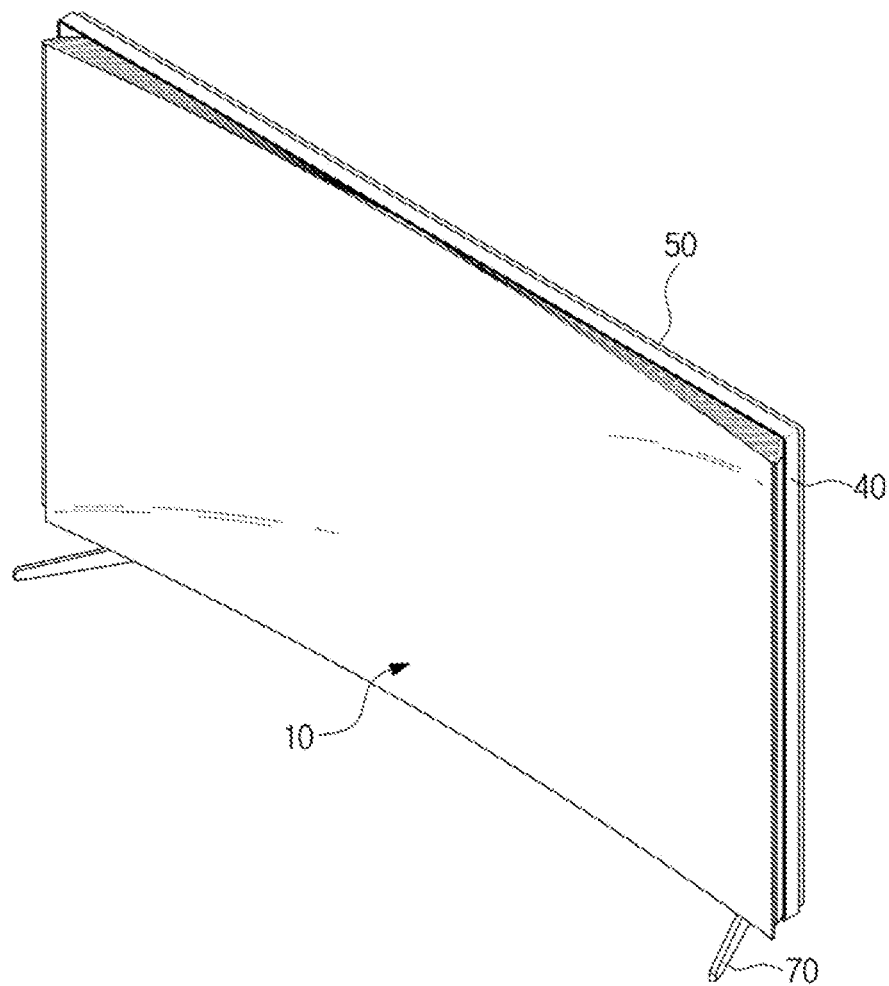
FIG. 1B is a diagram illustrating the display apparatus when the display module is in a curved state, according to an exemplary embodiment.
Figure 2A:
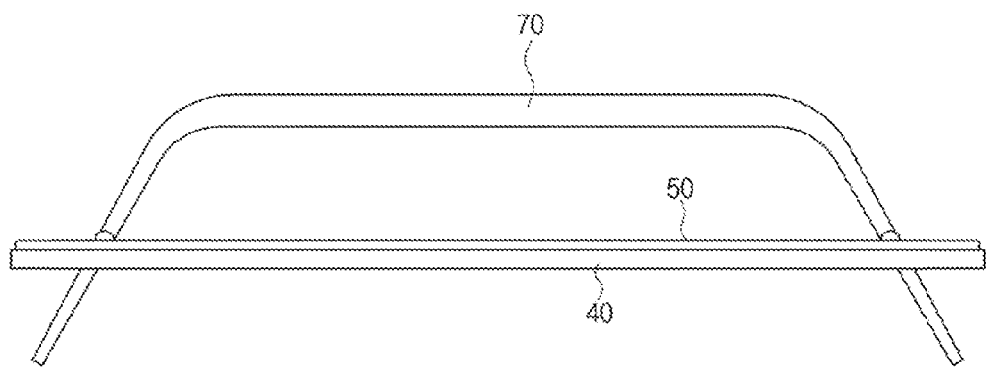
FIG. 2A is a plane view of the display apparatus when the display module is in a flat state, according to an exemplary embodiment.
Figure 2B:
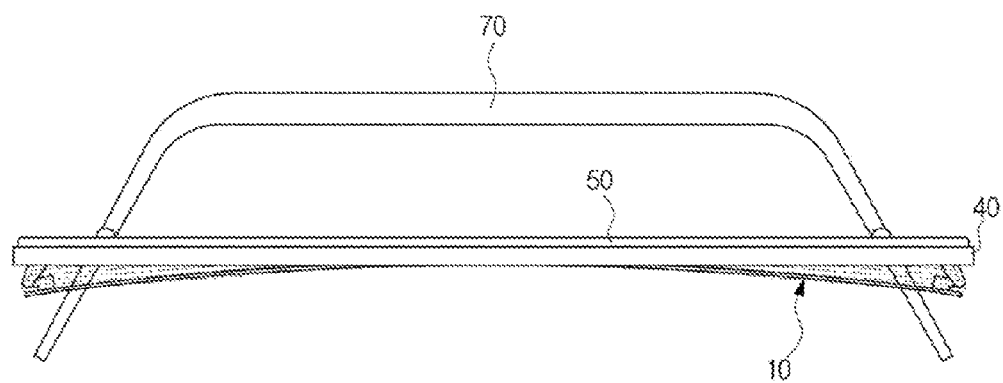
FIG. 2B is a plane view of the display apparatus when the display module is in a curved state, according to an exemplary embodiment.

FIG. 1A is a diagram illustrating a display apparatus when a display module is in a flat state, according to an exemplary embodiment, and FIG. 1B is a diagram illustrating the display apparatus when the display module is in a curved state, according to an exemplary embodiment. Also, FIG. 2A is a plane view of the display apparatus when the display module is in a flat state, according to an exemplary embodiment, and FIG. 2B is a plane view of the display apparatus when the display module is in a curved state, according to an exemplary embodiment.

Referring to FIG. 1A, the display apparatus includes a display module 10 configured with a display panel and a support panel, a side case 40 forming the sides of the display apparatus, a rear case 50 forming the rear part of the display apparatus, and a stand 70 which may be detachably attached on the rear case 50 and which enables the display apparatus to stand erect.

As another example, the display apparatus may be fixed on a wall through wall-mounted brackets that are installed in the wall. For example, the wall-mounted brackets may be detachably attached on the rear case 50.

The display module 10 may include a self-emitting display device or a non-emissive display device. The self-emitting display device may electrically excite fluorescent organic compounds such as Organic Light Emitting Diodes (OLED) in order to emit light. The non-emissive display device may use a separate light source, and may be a Liquid Crystal Display (LCD).

Referring to FIGS. 1A and 2A, the display apparatus may include a display module that is in a flat state. The flat state refers to a state in which the display module 10 has a curvature of zero.

According to an aspect of an exemplary embodiment, the display module 10 that is in the flat state may be transformed to a curved state in which both lateral edges of the display module 10 protrude forward.

For example, in FIGS. 1B and 2B, the display module 10 is transformed to a curved state as shown. Herein, the curved state refers to a state in which a display module has a curvature of some amount but not zero. For example, the curved state may refer to a curvature that has a predetermined value.

Because the display module 10 may be transformed from a flat state to a curved state, the display apparatus may provide viewers with images that have a three-dimensional effect and a sense of immersion. Also, because the display module 10 may be transformed between a flat state and a curved state by changing the curvature of the display module 10, the display apparatus is capable of providing viewers with various display environments, for example, based on a user preference, a preset preference, and the like.

Hereinafter, various examples of changing a curvature of a display module are described with reference to FIGS. 3A, 3B, and 3C.

Figure 3A:
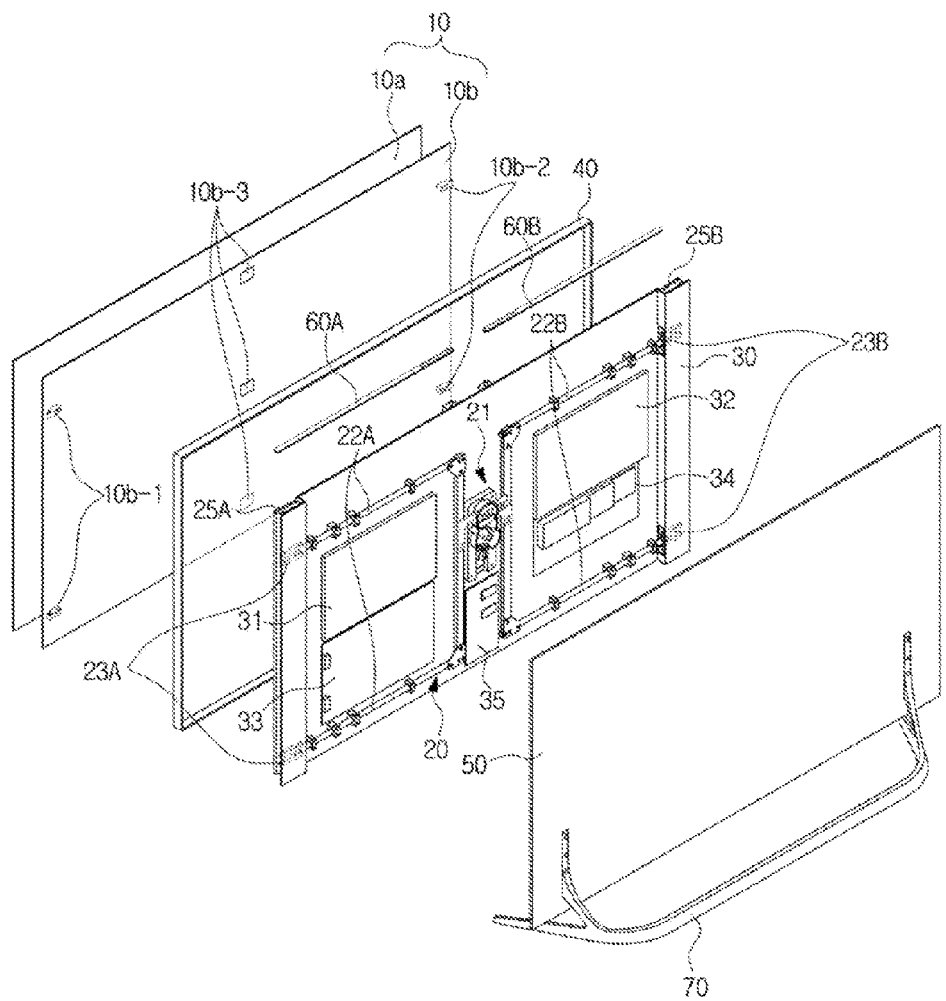
FIGS. 3A, 3B, and 3C are exploded perspective diagrams of display apparatuses including display panels configured with Organic Light Emitting Diodes (OLEDs), according to various exemplary embodiments.
Figure 3B:
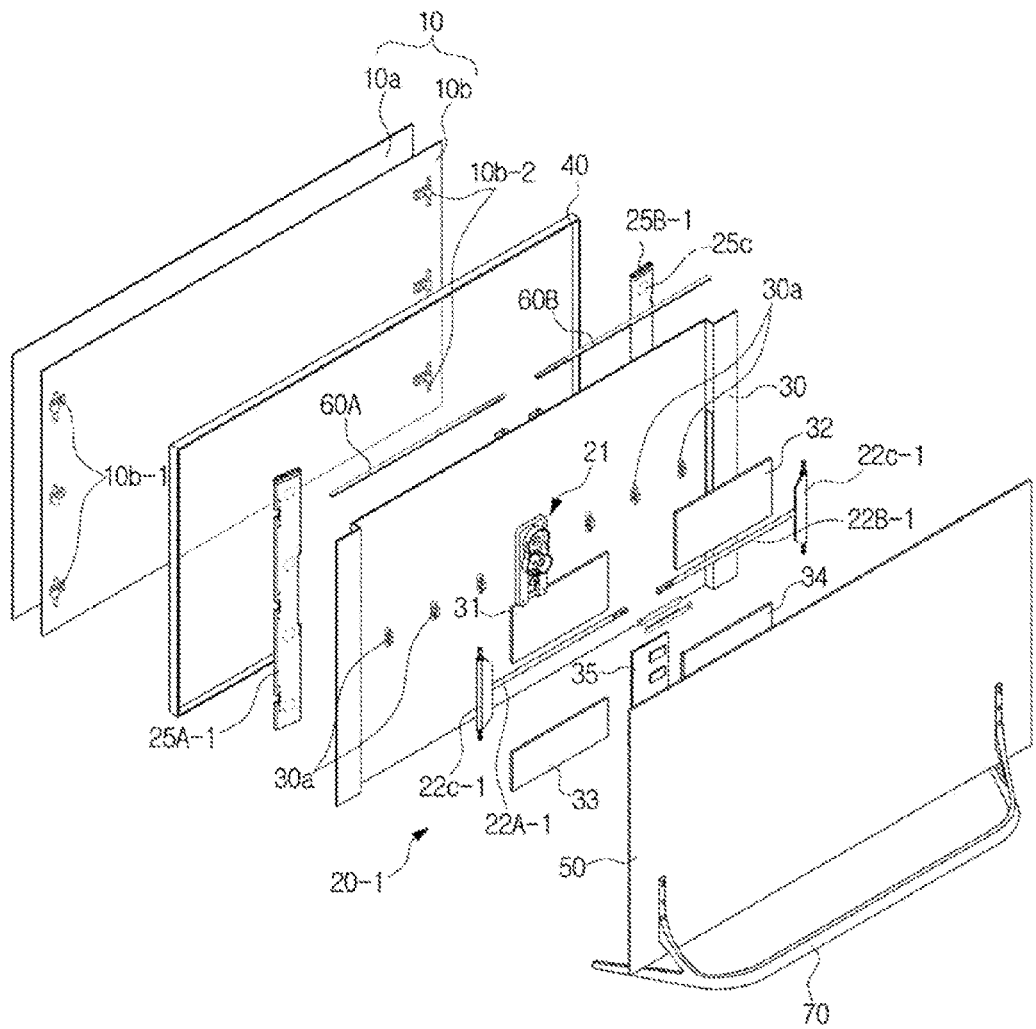
Figure 3C:
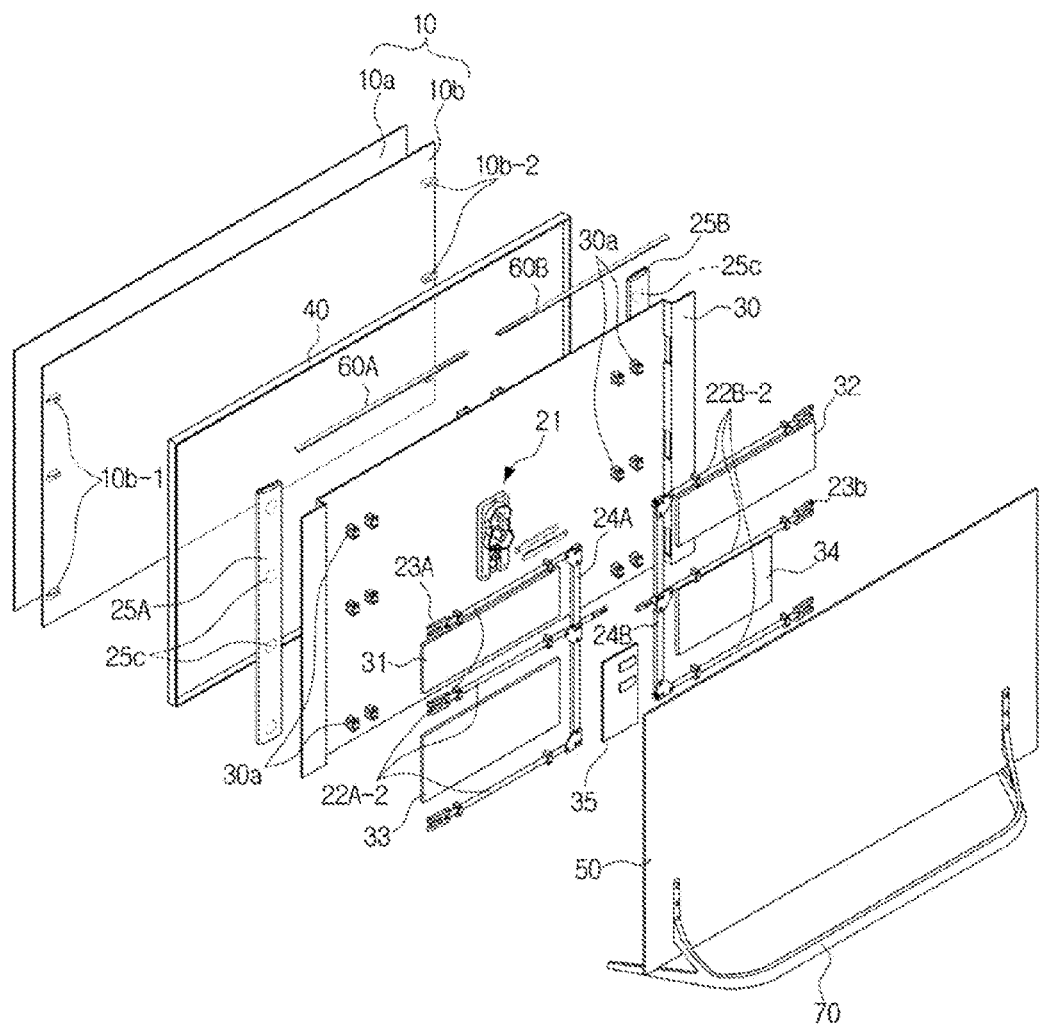

FIGS. 3A, 3B, and 3C are exploded perspective diagrams of display apparatuses including display panels configured with OLED, according to various exemplary embodiments.

Referring to FIG. 3A, the display module 10 may be partially fixed on a base member 30. For example, the display module 10 may be fixed on the base member 30 through one or more stud members 10b-3 (shown in FIG. 3A) fixed on a support panel 10b in order to prevent the center part of the display module 10 from moving forward.

The display apparatus may also include a driver 20 that may be fixedly mounted on the base member 30. For example, the driver 20 may transform the display module 10 from a flat state to a curved state, and vice versa.

To do this, the driver 20 may be positioned at a center part of the base member 30 located behind the display module 10. As an example, the driver 20 may include a power supply unit 21 configured to generate power for transforming the display module 10 symmetrically at both lateral edges, a plurality of moving members 22A and 22B configured to receive power from the power supply unit 21 and to move in opposite directions symmetrically from the power supply unit 21, and a plurality of rotating members 23A and 23B configured to rotate according to movements of the moving members 22A and 22B to move both of the lateral edges of the display module 10 forward and backward.

When the power supply unit 21 is fixed on the base member 30, the display module 10 may be transformed from a flat state to a curved state or from the curved state to the flat state against the base member 30. Also, because the power supply unit 21 is positioned at a center part of the base member 30 behind the display module 10 in the example above, distances between the power supply unit 21 and both lateral edges of the display module 10 may be substantially equal to each other. Accordingly, power generated by the power supply unit 21 may be transferred equally to both sides of the display module 10, and as a result, the lateral edges of the display module 10 may be symmetrically transformed against or with respect to the power supply unit 21.

The plurality of moving members 22A and 22B may include a plurality of first moving members 22A that may receive power from the power supply unit 21 and move linearly in a width direction of the display module 10, and a plurality of second moving members 22B that may also receive power from the power supply unit 21 and move linearly in a direction that is opposite to the direction in which the first moving members 22A move.

The plurality of rotating members 23A and 23B may include a plurality of first rotating members 23A that have ends that are rotatably connected to the first moving members 22A and that have other ends that are rotatably connected to a first lateral edge of the display module 10 and which rotate according to movements of the first moving members 22A to move the first lateral edge of the display module 10 forward and/or backward. The rotating members 23A and 23B may also include a plurality of second rotating members 23B that have ends that are rotatably connected to the second moving members 22B and that have other ends that are rotatably connected to a second lateral edge of the display module 10 that is opposite to the first lateral edge and which rotate according to movements of the second moving members 22B to move the second lateral edge of the display module 10 forward and/or backward.

In the current exemplary embodiment, the first moving members 22A may include two members that are spaced apart from each other in a vertical direction and which move together because they are connected to each other through a first connecting member 24A extending vertically. Also, the second moving members 22B may include two members that are spaced apart from each other in the vertical direction and move together because they are connected to each other through a second connecting member 24B extending vertically.

Meanwhile, at one edge of the rear part of the display module 10, a pair of first hinge members 10b-1 with which the other ends of the first rotating members 23A are rotatably coupled are spaced apart from each other in the vertical direction. At the other edge of the rear part of the display module 10, a pair of second hinge members 10b-2 with which the other ends of the second rotating members 23B are rotatably coupled are spaced apart from each other in the vertical direction.

The display apparatus may include a first shield module 25A extending vertically, where the first rotating members 23A are installed in the upper and lower parts thereof, and a second shield module 25B extending vertically, where the second rotating members 23B are installed in the upper and lower parts thereof, as shown in FIG. 3A. The first shield module 25A and the second shield module 25B may be fixed at the first rotating members 23A and the second rotating members 23B, respectively.

In some examples, the first and second shield modules 25A and 25B may partially cover spaces between the side case 40 and both side ends of the display module 10 that protrude forward when the display module 10 is in the curved state. Also, each of the first and second shield modules 25A and 25B may include a sound output unit 25C and may function as a speaker module.

The base member 30 may be formed in a shape of a rectangular plate to correspond to a shape of the display module 10, and may support the display module 10 at the rear. The power supply unit 21 may be mounted at the center of the base member 30.

The driver 20 may move both lateral edges of the display module 10 backward in order to transform the display module 10 to a flat state corresponding to the base member 30. Also, the driver 20 may move both lateral edges of the display module 10 forward to transform the display module 10 to a curved state. According to one or more exemplary embodiments, the driver 20 may be configured to change a curvature of the display module 10 while maintaining a shape of the base member 30.

As shown in FIG. 3A, the power supply unit 21 may be mounted at the rear, center part of the base member 30 so that power can be stably transferred to the upper and lower lateral parts of the display module 10. As another example, the power supply unit 21 may be mounted on an upper (or lower), center part of the base member 30.

FIG. 3B is an exploded perspective view of a display apparatus according to another exemplary embodiment.

In the example of FIG. 3B, unlike the example of FIG. 3A, the driver 20 includes a first moving member 22A-1 and a second moving member 22B-1.

One end of the first and second moving members 22A-1 and 22B-1 may be respectively connected to two hinge members 22c-1 that extend vertically with a predetermined length. In this example, the hinge members 22c-1 may be rotatably installed at a first shield module 25A-1 and a second shield module 25B-1, respectively.

The first shield module 25A-1 and the second shield module 25B-1 may be rotatably arranged behind the display module 10 through the first and second hinge members 10b-1 and 10b-2 which are fixed on the rear part of the display module 10.

FIG. 3C is an exploded perspective view of a display apparatus according to still another exemplary embodiment.

Referring to FIG. 3C, a driver may include three first moving members 22A-2 which are spaced apart from each other in a vertical direction and which are connected to each other through a first connecting member 24A, and three second moving members 22B-2 which are spaced apart from each other in a vertical direction and which are connected to each other through a second connecting member 24B.

In the example of FIG. 3C, the first moving members 22A-2 and the second moving members 22B-2 may transfer power simultaneously to the upper, middle, and lower areas of both lateral edges of the display module 10. Accordingly, the display module 10 may be more stably transformed than when a driver including one or two moving members is used.

As such, a driver including various numbers of first and second moving members may be provided. The numbers or the amount of first and second moving members may be determined to correspond to a kind of the display panel 10a.

Figure 4A:
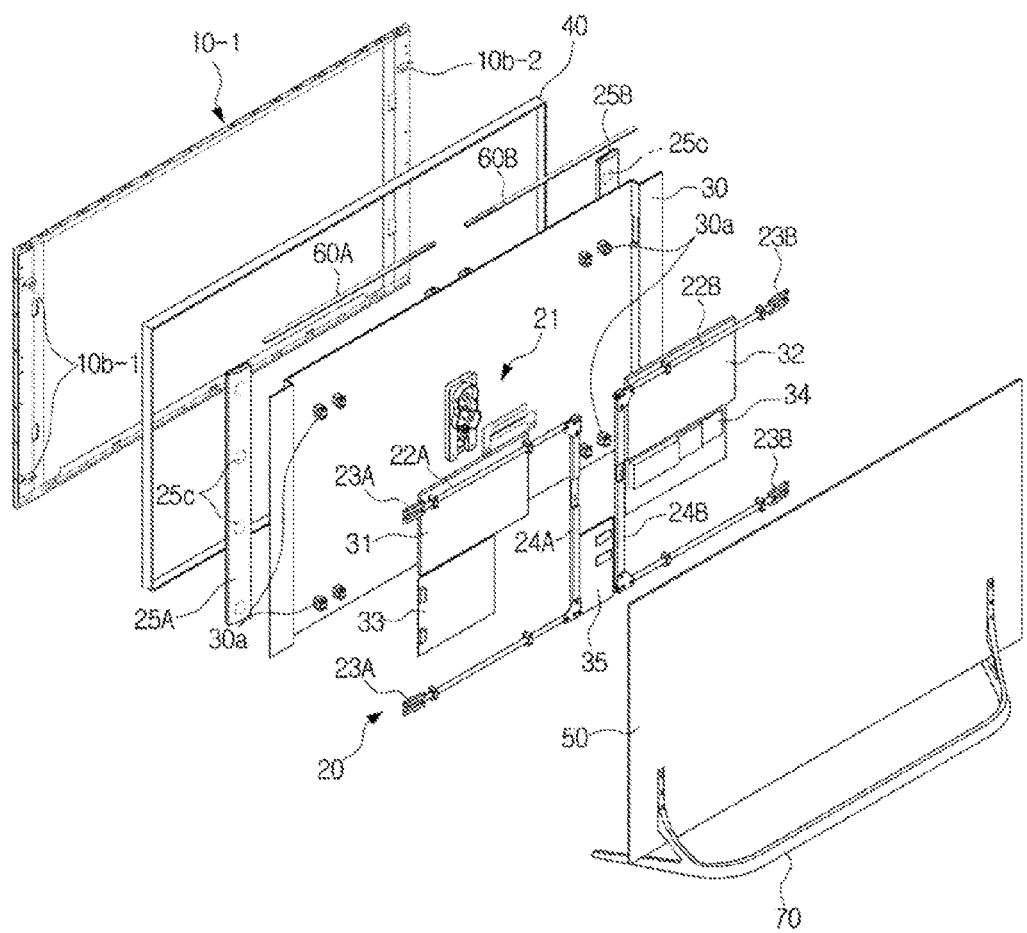
FIGS. 4A, 4B, and 4C are exploded perspective diagrams of display apparatuses including display panels configured with Liquid Crystal Displays (LCDs), according to various exemplary embodiments.
Figure 4B:
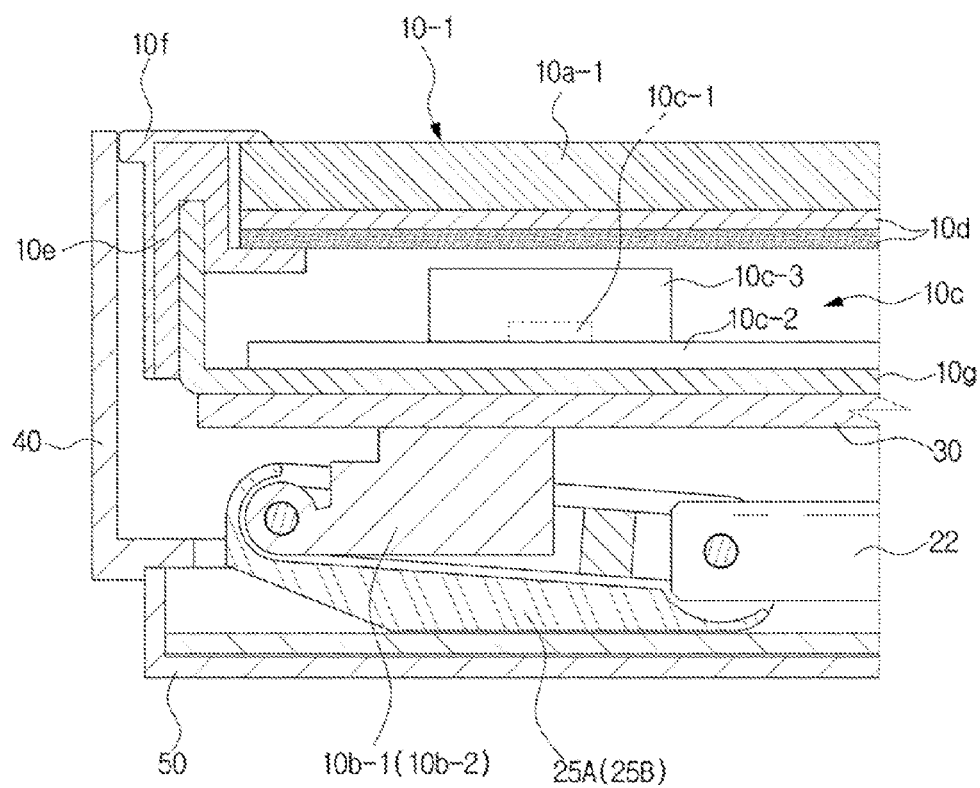
Figure 4C:
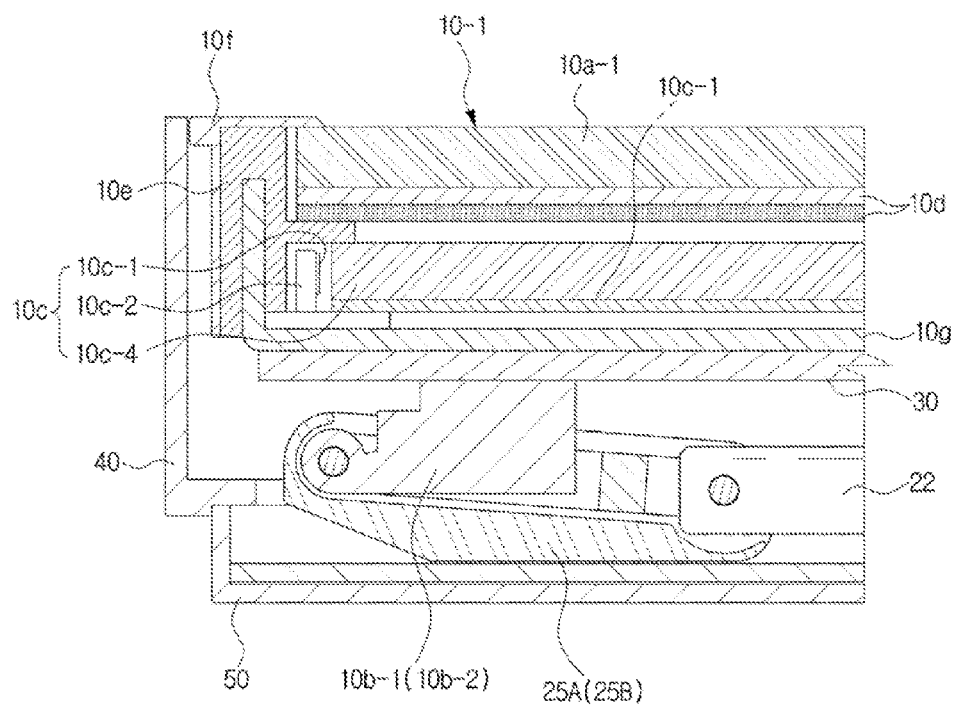

FIGS. 4A, 4B, and 4C are exploded perspective diagrams of display apparatuses having display panels configured with Liquid Crystal Displays (LCDs), according to various exemplary embodiments.

FIG. 4A is an exploded perspective diagram of a display apparatus including a display panel configured with a LCD, according to an exemplary embodiment, and FIG. 4B is a cross-sectional view of the display apparatus including the display panel configured with the LCD, according to an exemplary embodiment.

Referring to FIGS. 4A and 4B, a display module 10-1 may include a display panel 10a-1 such as an LCD panel, a backlight unit 10c spaced apart from the display panel 10a-1 behind the display panel 10a-1 and configured to irradiate light to the display panel 10a-1, a plurality of optical sheets 10d arranged behind the display panel 10a-1, a middle mold 10e configured to support the display panel 10a-1, a front chassis 10f disposed in front of the middle mold 10e and configured to maintain the state of the display panel 10a-1 mounted on the middle mold 10e, and a rear chassis 10g disposed behind the middle mold 10e and configured to accommodate the backlight unit 10e therein.

For example, the backlight unit 10c may include a plurality of light-emitting diodes (LEDs) 10c-1 that may irradiate light directly toward the rear side of the display panel 10a-1, a substrate 10c-2 on which the plurality of LEDs 10c-1 are mounted, and a plurality of lenses 10c-3 that diffuse light that is emitted from the LEDs 10c-1.

The display panel 10a-1 which is a LCD panel may include a glass substrate. Accordingly, a maximum curvature of the display panel 10a-1 may be inversely proportional to a thickness of the glass substrate. For example, the thinner the thickness of the glass substrate of the display panel 10a-1, the greater the amount the display panel 10a-1 may be curved, and the thicker the thickness of the glass substrate of the display panel 10a-1, the smaller the amount the display panel 10a-1 may be curved. As a non-limiting example, the display panel 10a-1 may be formed to have a curvature radius of 4000 mm or more.

Also, if the display module 10 includes the display panel 10a-1 as an LCD panel, the display module 10 will have an additional thickness because the display module 10 will further include the backlight unit 10c.

Accordingly, when the display module 10 is transformed, the front chassis 10f that forms the front part of the display module 10 may be transformed at a greater curvature than that of the rear chassis 10g forming the rear part of the display module 10.

In order to enable the front chassis 10f to be transformed at a greater curvature than the rear chassis 10g, for example, the front chassis 10f may include transform guide holes extending in the width direction of the display module 10, and the rear chassis 10g may include guide screws that are inserted into and coupled with the transform guide holes. In this example, because the transform guide holes extend in the width direction of the display module 10, both lateral edges of the front chassis 10f may move relatively against both lateral edges of the rear chassis 10g.

In the example of FIG. 4B, the LEDs 10c-1 are arranged to face the rear part of the display panel 10a-1 to irradiate light directly to the rear part of the display panel 10a-1.

However, in the display apparatus shown in the example of FIG. 4C, a light guide plate 10C-4 may be disposed behind the display panel 10a-1, and a plurality of LEDs 10c-1 may be arranged along both sides of the light guide plate 10c-4 to irradiate light to both side ends of the light guide plate 10c-4.

Figure 5A:
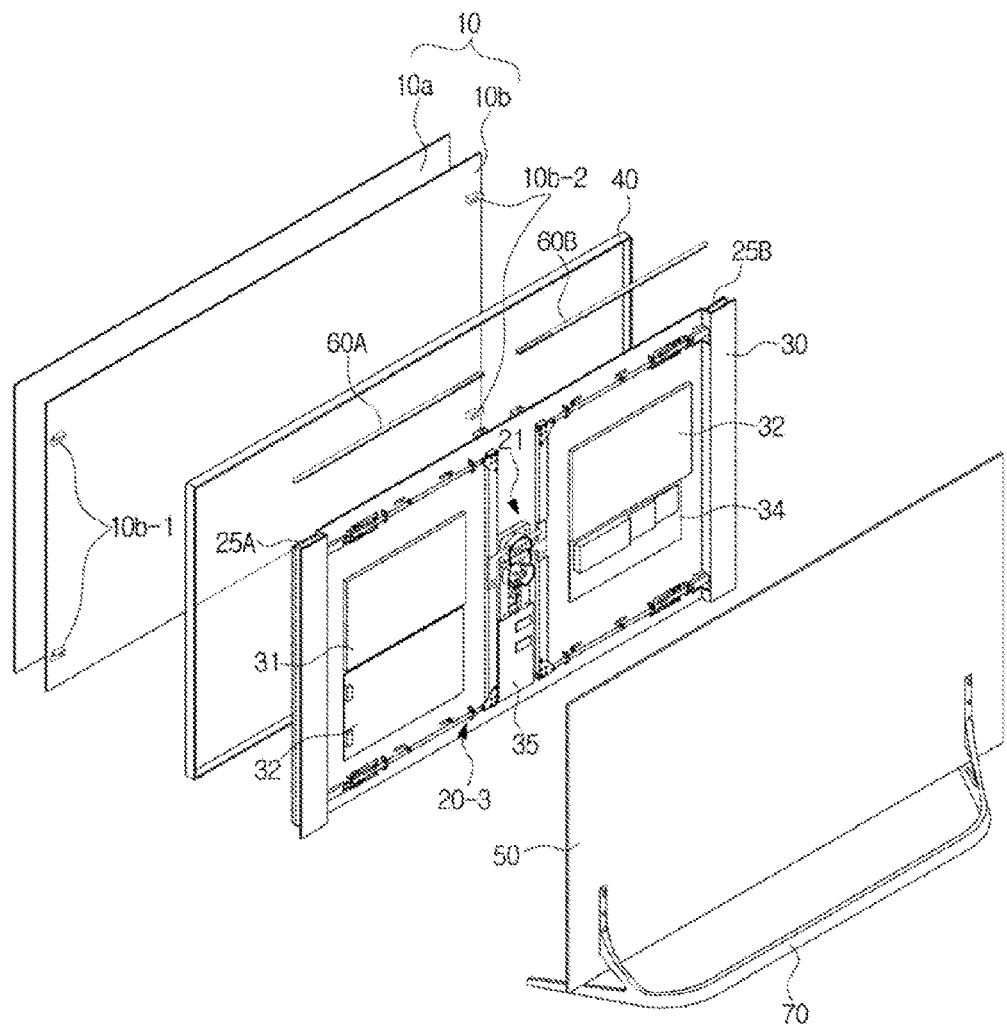
FIGS. 5A and 5B are exploded perspective diagrams of a display apparatus including a plurality of stoppers, according to an exemplary embodiment.
Figure 5B:
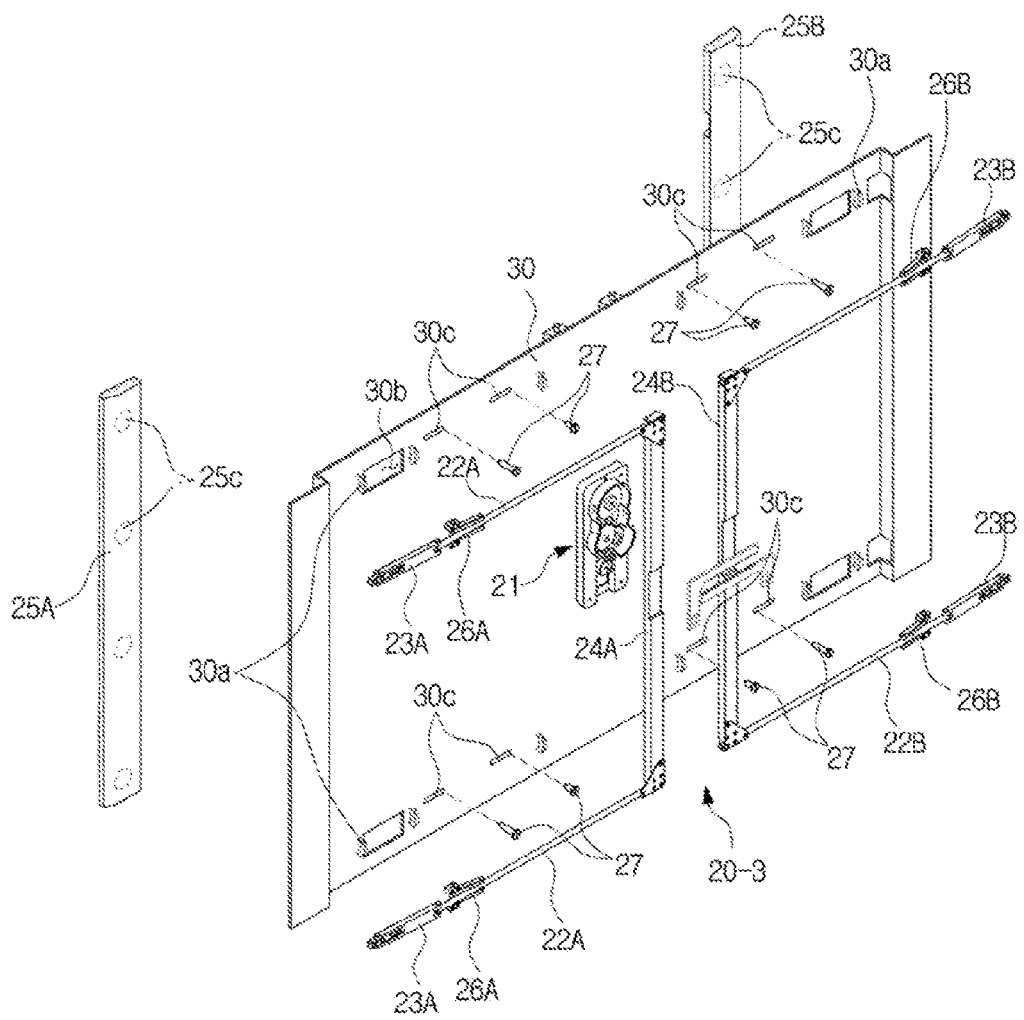

FIGS. 5A and 5B are exploded perspective diagrams of a display apparatus including a plurality of stoppers, according to an exemplary embodiment. FIG. 5A is an exploded perspective view of the display apparatus including the plurality of stoppers, according to an exemplary embodiment, and FIG. 5B is an exploded perspective view of a driver included in the display apparatus including the plurality of stoppers, according to an exemplary embodiment.

Referring to FIGS. 5A and 5B, driver 20-3 may include a pair of first moving members 22A, a pair of second moving members 22B, a first rotating member 25A, a second rotating member 25B, a first connecting member 24A, a second connecting member 24B, and a driving unit 21.

Also, the driver 20-3 may include a plurality of stoppers 26A, 26B, and 26C which are connected to the rear part of the display module 10 and which may be used to limit transformation of the display module 10 so that the display module 10 may be accurately transformed to a predetermined curvature amount.

For example, the stoppers 26A, 26B, and 27 may include a plurality of rotating stoppers 26A and 26B that rotate according to transformation of the display module 10, and a plurality of fixed stoppers 27 that are fixed on the rear part of the display module 10.

The rotating stoppers 26A and 26B may have one end that is rotatably connected to the first moving members 22A and the second moving members 22B, and another end that is rotatably connected to the rear part of the display module 10 through a plurality of through holes 30b that are formed in the base member 30, thereby rotating according to the transformation of the display module 10.

The fixed stoppers 27 may have front ends fixed on the rear part of the display module 10, and back ends that protrude behind the base member 30 through a plurality of catching holes 30c formed in the base member 30. Also, each back end of the fixed stoppers 27 may include a catching part that is caught by the edge of the corresponding catching hole 30c of the base member 30 when the display module 10 is transformed to a curved state.

Because the back ends of the fixed stoppers 27 may move in the width direction of the display module 10 when the display module 10 is transformed to the curved state, the catching holes 30c may extend in the width direction of the display module 10 to correspond to the movements of the back ends of the fixed stoppers 27.

The rotating stoppers 26A and 26B may be provided as four pieces that have four ends that are rotatably connected to the two first moving members 22A and the two second moving members 22B, respectively. The rotating stoppers 26A and 26B may be installed adjacent to the first rotating member 25A and the second rotating member 25B.

The fixed stoppers 27 may be provided as eight pieces such that four pieces are spaced apart from each other in the width direction on an upper rear part of the display module 10 and the remaining four pieces may be spaced apart from each other in the width direction of the lower rear part of the display module 10.

The lengths of the four fixed stoppers 27 installed in the center part of the display module 10 may be shorter than those of the remaining four fixed stoppers 27. Accordingly, when the display module 10 is transformed, both lateral edges of the display module 10 may move more than the center part of the display module 10, in a back-and-forth direction.

When the display module 10 is in the flat state, the rotating stoppers 26A and 26B may contact the moving members 22A and 22B, and when the display module 10 is in the curved state, the rotating stoppers 26A and 26B may be spaced apart from the moving members 22A and 22B because of the catching parts 27a that protrude backward from the base member 30.

When the display module 10 is transformed from the flat state to the curved state, the rotating stoppers 26A and 26B may rotate, and the fixed stoppers 27 may move forward such that they are caught by the edges of the catching holes 30c of the base member 30.

According to various exemplary embodiments, by adjusting the lengths of the rotating stoppers 26A and 26B and the fixed stoppers 27 according to a design, it is possible to accurately adjust the curvature of the display module 10 according to area when the display module 10 is transformed.

When the display apparatus is powered on, for example, by a user pressing a button or by a predetermined event occurring, the display apparatus may perform booting before displaying images so that the individual components of the display apparatus are in a normal operating state. However, a user typically has to wait to input a command for changing a curvature of the display module 10 until booting is completed. Accordingly, the user needs to wait an amount of time corresponding to a sum of a booting time and a bending time in order to turn on and bend the display to the curved state, in order to see images through the curved display module 10.

One or more of the exemplary embodiments herein relate to the display module 10 that is bent during a booting time in order to minimize the user's waiting time. Accordingly, user satisfaction may be increased.

Hereinafter, a display apparatus that can bend a display module during booting will be described.

Figure 6A:
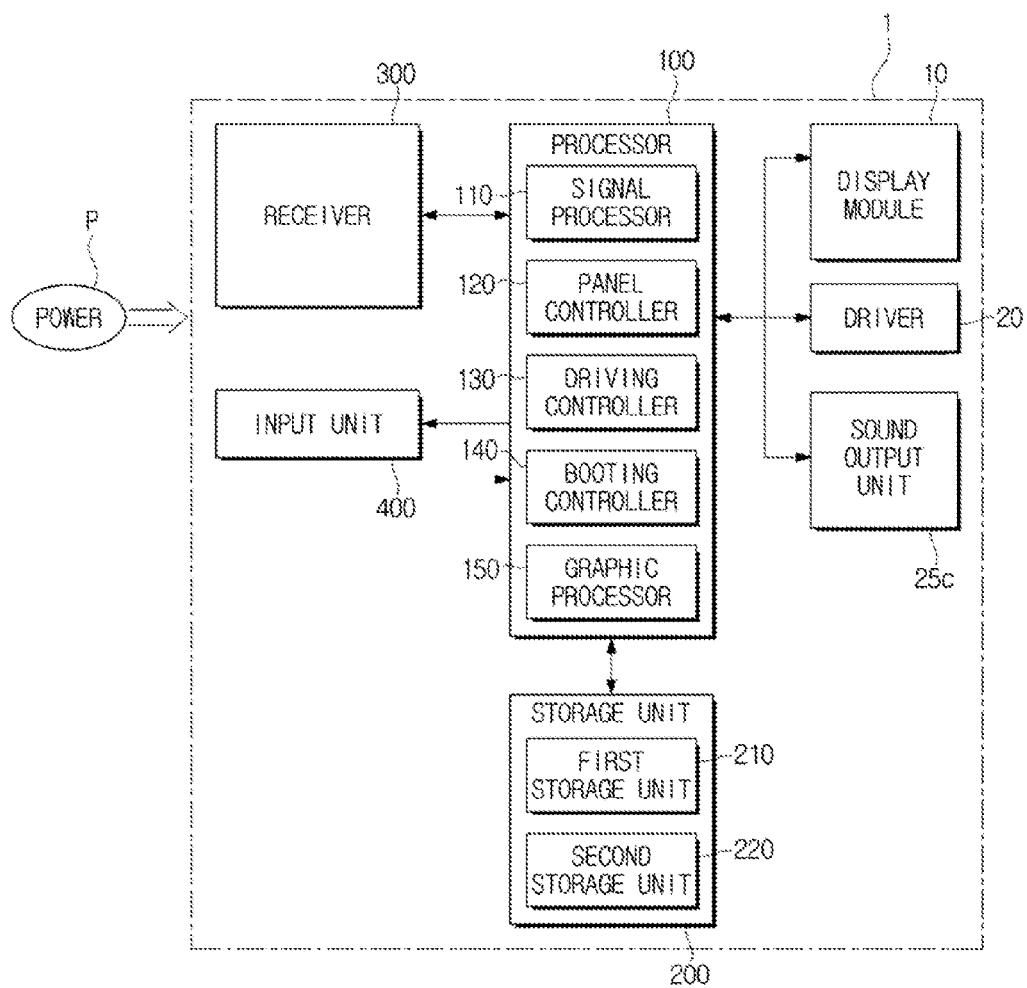
FIGS. 6A and 6B are block diagrams of display apparatuses according to various exemplary embodiments.
Figure 6B:
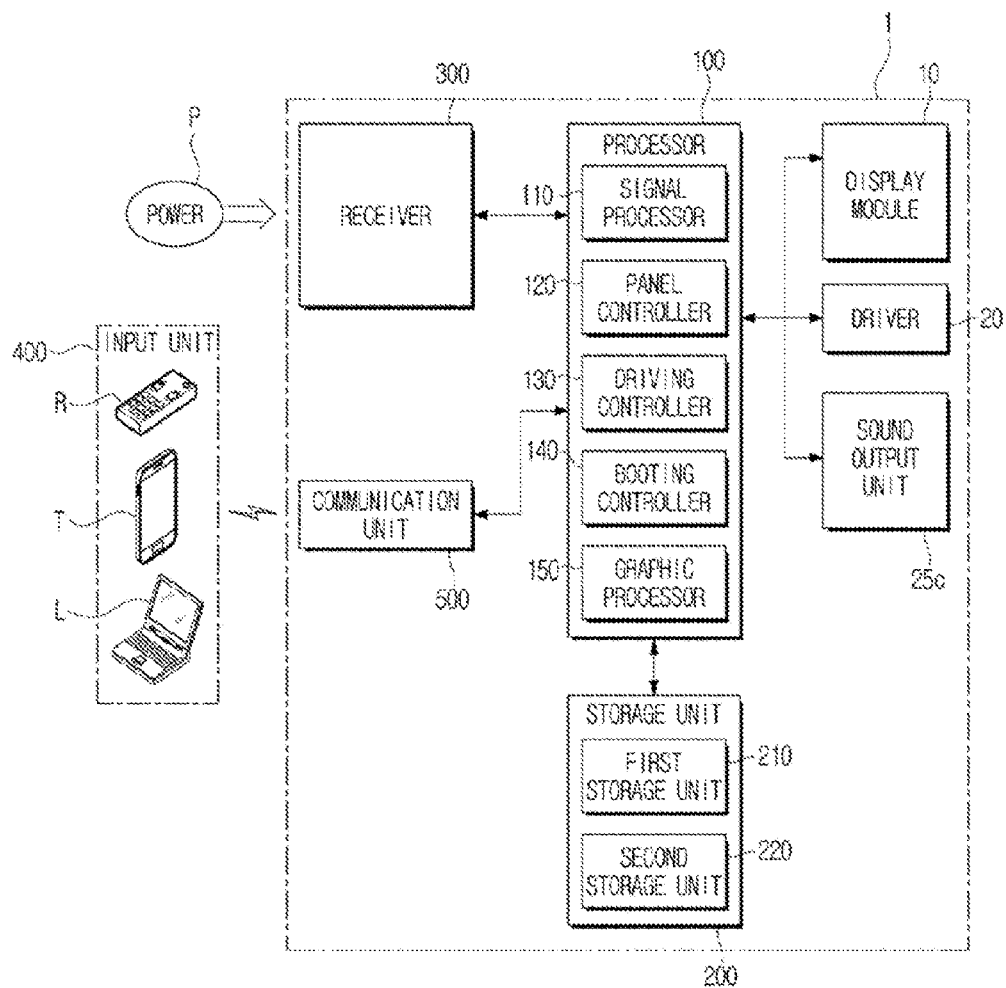
Figure 7:
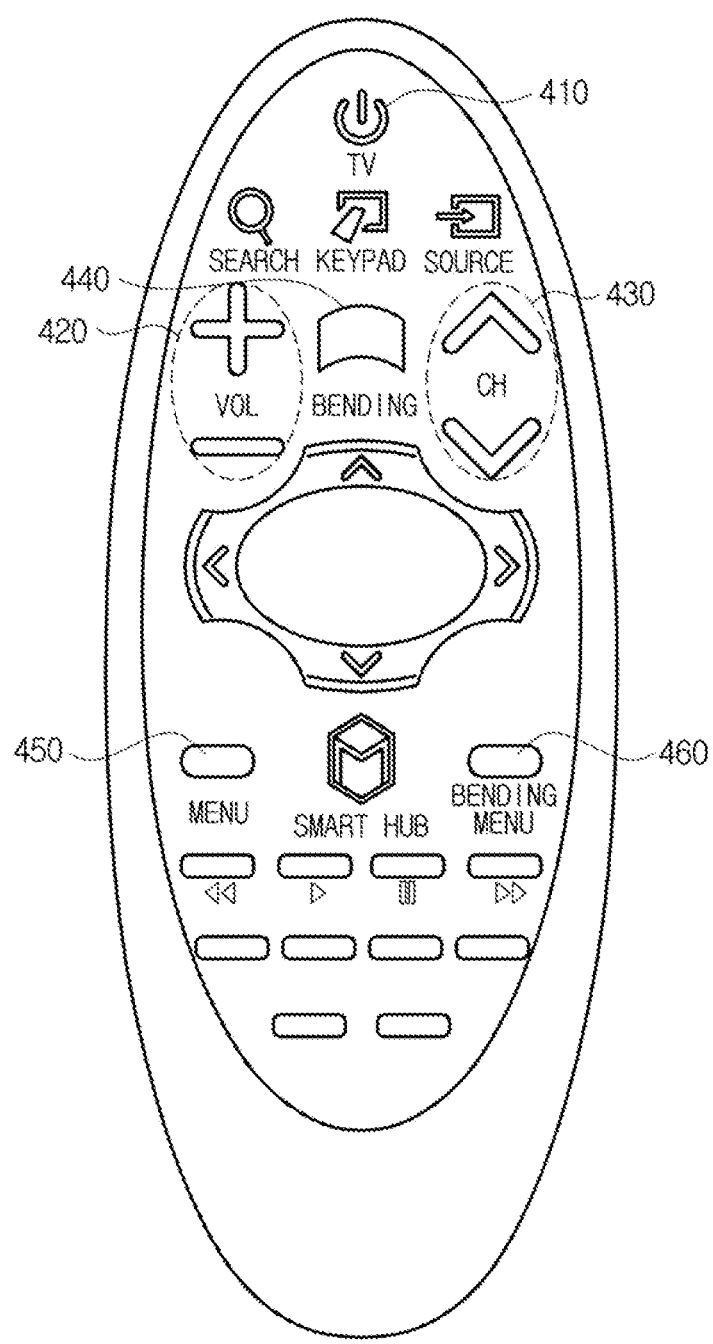
FIG. 7 is a diagram illustrating an input unit of a display apparatus according to an exemplary embodiment.

FIGS. 6A and 6B are block diagrams of display apparatuses according to various exemplary embodiments, and FIG. 7 is a diagram illustrating an input unit of a display apparatus according to an exemplary embodiment.

As shown in FIG. 6A, display apparatus 1 includes a receiver 300, a display module 10, a sound output unit 25c, an input unit 400, a storage unit 200, and a processor 100.

The processor 100 may be implemented as an integrated circuit in a microprocessor. As another example, the processor 100 may be implemented as software such as firmware. Also, the processor 100 may be implemented as a separate chip. Referring to FIG. 6A, the processor 100 may include a signal processor 110, a panel controller 120, a driving controller 130, a booting controller 140, and a graphic processor 150.

The receiver 300 may receive broadcasting signals. For example, the broadcasting signals received by the receiver 300 may be base signals that may be used for creating a broadcasting image that is to be displayed on the display module 10. To display broadcasting images, the receiver 300 may include a tuner (not shown) to tune to a channel, and a demodulator (not shown) to demodulate broadcasting signals that are received through the tuned channel.

The tuner may select Radio Frequency (RF) signals corresponding to a predetermined channel from among RF broadcasting signals received through an antenna. Also, the tuner may convert the selected RF signals into intermediate frequency signals, a base-band image, sound signals, and the like.

The demodulator may receive the signals converted by the tuner, and demodulate the received signals. As a result, the demodulator may output stream signals. For example, the stream signals may be multiplexed signals of image signals, sound signals, or data signals.

Also, the receiver 300 may receive external image signals, external sound signals, external information signals, and the like. The external image signals, the external sound signals, and the external information signals may be base signals that may be used for creating an image except for broadcasting images.

In order to receive external image signals, external sound signals, and/or external information signals, the receiver 300 may further include a network interface and/or an external device interface. For example, the receiver 300 may receive external signals from an external device through the network interface or the external device interface, and transfer the received signals to the processor 100, an example of which is described later.

The network interface may connect the display apparatus 1 to a wired/wireless network including the Internet. For example, the network interface may include an Ethernet terminal for connecting to a wired network, and the network interface may connect to a wireless network using a communication standard, such as Wireless Local Area Network (WLAN), Wireless Fidelity (Wi-Fi), Wireless Broadband (Wibro), World Interoperability for Microwave Access (Wimax), High Speed Downlink Packet Access (HSDPA), and the like.

The external device interface may connect an external device to the display apparatus 1. For example, the external device interface may connect to an external device such as Digital Versatile Disk (DVD), Blue-Ray, games, a camera, a camcorder, a computer (a laptop computer), and the like, in a wired/wireless fashion. The external device interface may receive external signals from an external device that is connected thereto, and transfer the received signals to the processor 100.

The processor 100 may include the signal processor 110 which may demultiplex stream signals that are received from the receiver 300 or which may process demultiplexed signals. As a result, the processor 100 may generate image signals that are capable of being displayed as an image by the display module 10, and sound signals that are capable of being output as sound by the sound output unit 25c.

Also, the display module 10 may receive image signals that are subject to signal processing by the processor 100 to output a broadcasting image, and the sound output unit 25c may receive sound signals subject to signal processing by the processor 100 to output sound.

The display module 10 may display broadcasting images using power that is received under the control of the panel controller 120 which is a component of the processor 100.

Also, the processor 100 may itself create a graphic or a text, without using signals that are received from an external device, and may control the display module 10 to display the graphic or the text. For example, the processor 100 may include the graphic processor 150 to generate On Screen Display (OSD) signals for displaying various information as graphics or text.

The graphic processor 150 may generate the OSD signals, and control the display module 10 to display various information that is related to the display apparatus 1, various information about an external device that is connected to the display apparatus 1, a user interface for a user to use to adjust settings of the display apparatus 1, various menu screens, widgets, icons, etc.

For example, the graphic processor 150 may generate OSD signals including information of the display apparatus 1, such as a channel that is currently being displayed or an amount of volume, or OSD signals for displaying a main setting window for main settings of the display apparatus 1, a bending setting window for changing a curvature of the display module 10, etc. Also, the processor 100 may control the overall operations of the display apparatus 1. For example, the processor 100 may control the power of the display apparatus 1 to be on/off and control the outputting of images/sound. Also, the processor 100 may control the driver 20 to change a curvature of the display module 10.

In order to control the display apparatus 1, the processor 100 may generate control signals according to an internal calculation, and transfer the generated control signals to the corresponding components of the display apparatus 1. Also, the processor 100 may generate control signals according to a user's control command that is input through the input unit 400, and control operations of the display apparatus 1 based on the control signals.

The input unit 400 may receive control commands for controlling the operation of the display apparatus 1 from a user. For example, the input unit 400 may be provided in the display apparatus 1, as shown in FIG. 6A.

Referring to FIG. 6B, the input unit 400 may communicate with a main body 1-1 that includes the receiver 300, the processor 100, the storage unit 200, the display module 10, the driver 20, and the sound output unit 25c, in a wireless fashion. In this example, the main body 1-1 may further include a communication unit 500 to communicate with the input unit 400.

As shown in FIG. 6B, the input unit 400 may be a remote controller R that communicates with the main body 1-1 using infrared light. Also, the input unit 400 may be a smart phone T or a laptop computer L capable of connecting to the same network to which the communication unit 500 of the main body 1-1 connects in order to communicate with the main body 1-1 through the network.

The input unit 400 may be implemented as a single device or implemented as a plurality of different devices. For example, the input unit 400 may be implemented as a remote controller R and a smart phone T.

As another example, the input unit 400 may be implemented as a device that is provided in the main body 1-1 and a separate device that communicates with the main body 1-1 in a wireless fashion. For example, the input unit 400 may be implemented as one or more buttons that are provided in the main body 1-1 and a remote controller to communicate with the main body 1-1.

The input unit 400 may receive various control commands from a user. FIG. 7 illustrates an example of a remote controller R that is used as the input unit 400 according to an exemplary embodiment. Referring to FIG. 7, the input unit 400 includes a plurality of buttons for receiving control commands. For example, the input unit 400 may include a channel switching button 420 to receive channel switching commands, a volume control button 430 to receive volume control commands, and a bending button 440 to receive commands for changing a curvature of the display module 10 (see FIG. 6B). In this example, the bending button 440 is a four-sided button with the top and bottom sides of the button being shaped in the form of a curve while the right and left sides of the button are in the shape of a straight line.

The bending button 440 may be a toggle switch. For example, by moving the toggle switch in one direction, a user may input a command for increasing a curvature of the display module 10, and by moving the toggle switch in the other direction, the user may input a command for decreasing a curvature of the display module 10.

In addition to the buttons shown in FIG. 7, in some examples the input unit 400 may further include a plurality of buttons that may receive various control commands for changing a kind of images that are displayed or for changing the brightness of images that are displayed.

Also, the input unit 400 may include a power button 410 for receiving a power on/off command. For example, the input unit 400 may receive a command for applying power to the display apparatus 1. If a power-on signal is transferred from the remote controller to the display apparatus 1 according to a user's input, the processor 100 may perform booting for normally operating the display apparatus 1.

For example, the processor 100 may further include the booting controller 140 (see FIG. 6B) to perform booting according to a predetermined booting sequence. In this example, the booting controller 140 may load a booting sequence that is stored in the storage unit 200 (see FIG. 6B) to perform booting.

The storage unit 200 may include a first storage unit 210 that stores a Basic Input Output System (BIOS), a booting sequence, a bootloader, and the like. The storage unit 200 may also include a second storage unit 220 that stores an Operating System (OS), a driver, applications, and the like. The first storage unit 210 may be a Read Only Memory (ROM), Erasable Programmable Read Only Memory (EPROM), flash memory, and the like, and the second storage unit 220 may be a hard disk, a floppy disk, a Compact Disk-Read Only Memory (CD-ROM), a Universal Serial Bus (USB), and the like. The first storage unit 210 may be integrated into the processor 100, and a plurality of second storage units 220 may be provided.

For example, the booting controller 140 may perform booting in an order of (1) loading BIOS; (2) initializing hardware of the display apparatus 1; (3) loading a bootloader; (4) executing OS; (5) loading a driver corresponding to the hardware of the display apparatus 1; and (6) executing an application according to a predetermined setting. To perform booting in the order, the booting controller 140 may generate booting control signals to control the booting.

The booting sequence described above may be an example of booting that is performed by the booting controller 140. According to one or more exemplary embodiments, the booting controller 140 may omit a specific step of the booting sequence, add a new step to the booting sequence, perform the booting sequence in a different order, and the like.

According to the booting sequence, (1) the booting controller 140 may load BIOS from the first storage unit 210. Here, the BIOS refers to a program that performs input and output operations to and from hardware in the lowest level, among programs stored in a computer.

(2) If loading the BIOS is completed, the booting controller 140 may execute a start-up routine of the BIOS to perform a Power-On Self Test (POST) process. The POST process refers to a series of operations of examining the states of the processor, memory, and peripherals, and then initializing them.

(3) If initializing the hardware is finished, the booting controller 140 may load a bootloader from the first storage unit 210. The bootloader refers to a program to develop an environment in which the OS can be executed. By loading the bootloader, the booting controller 140 can execute OS stored in the second storage unit 220.

As a non-limiting example, the bootloader may be Linux Loader (LILO), Grand UnifiedBootloader (GRUB), Boot Loader Object (BLOB), Universal Bootloader (U-BOOT), ARMBOOT, REDBOOT, Bootldr, Angel, and the like.

(4) If the bootloader is loaded, the booting controller 140 may execute the OS that is stored in the second storage unit 220. For example, the OS may be Windows-based OS, Unix, Linux, Palm OS, DOS, Android, Macintosh, or the like, but is not limited to these.

(5) After the OS is executed, the booting controller 140 may load a hardware driver that is stored in the storage unit 220. For example, the hardware driver may interwork with the OS to drive the hardware of the display apparatus 1. For example, the hardware driver may include a display driver for driving the display module 10, a graphic driver for driving the signal processor 110 to process image signals, and a sound driver for driving the signal processor 110 to process sound signals. However, the hardware drivers are not limited to these drivers.

(6) Finally, applications for performing various functions of the display apparatus 1 may be executed.

During the booting process, the processor 100 may control the driver 20 to bend the display module 10. Generally, while the processor 100 performs booting according to a booting sequence, a user is not able to receive or view desired images through the display apparatus 1. By transforming the display module 10 to a curved state automatically during booting, a user's waiting time for booting and transforming may be reduced.

According to one or more exemplary embodiments, the input unit 400 may receive a bending command for bending the display module 10 during booting of the display module 10. Referring to FIG. 7, the input unit 400 may include a menu button 450 for displaying a main setting window M for the display apparatus 1, and a bending menu button 460 for displaying a bending setting window S for the display module 10.

Figure 8:
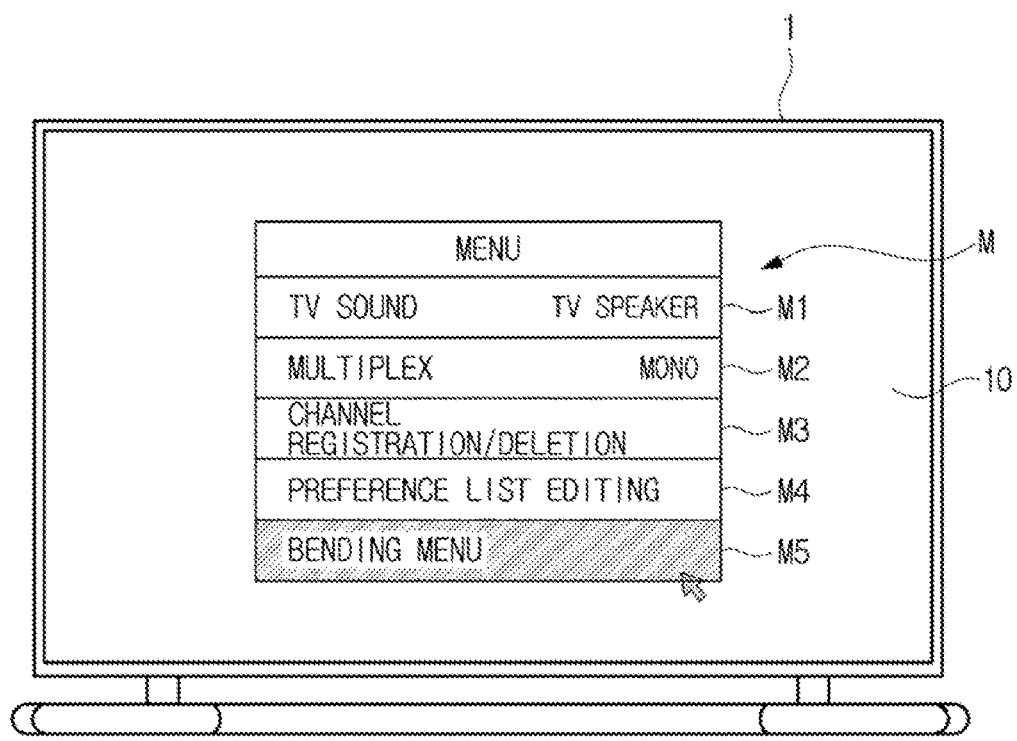
FIG. 8 is a diagram illustrating displaying a main setting window in a display apparatus according to an exemplary embodiment.
Figure 9:
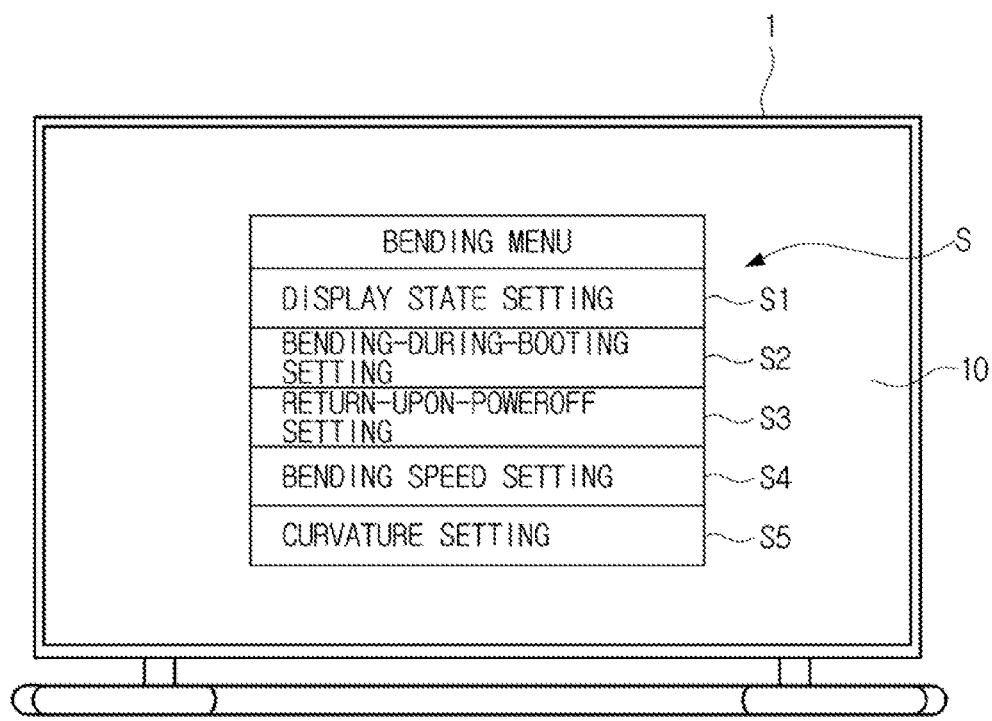
FIG. 9 is a diagram illustrating displaying a bending setting window for changing a curvature of a display module in a display apparatus according to an exemplary embodiment.

FIG. 8 is a diagram illustrating displaying a main setting window in the display apparatus according to an exemplary embodiment, and FIG. 9 is a diagram illustrating displaying a bending setting window for changing a curvature of the display module in the display apparatus according to an exemplary embodiment.

In order to bend the display module 10 during booting, a user may input a command for displaying the main setting window M by pressing the menu button 450 of the input unit 400. For example, the main setting window M may include a TV sound setting item M1, a sound multiplex setting item M2, a channel registration/deletion item M3, and a preference list editing item M4. The main setting window may further include a bending setting item M5 for changing a curvature of a display module. The user may select the bending setting item M5 in the main setting window M to display the bending setting window S on the display module 10.

As another example, the user may input a command for displaying the bending setting window S by pressing the bending menu button 460 of the input unit 400.

Referring to FIG. 9, the bending setting window S may include a display state setting item 51 for setting a state of the display module 10 (that is, a curved state or a flat state), a bending setting item S2 for setting whether to bend the display module 10 during booting, a return setting item S3 for setting whether to return upon power-off, a bending speed setting item S4, and a target curvature setting item S5.

However, it should be appreciated that the bending setting window S shown in FIG. 9 is merely for purposes of example, and the bending setting window S may include additional items shown in FIG. 9 and/or omit one of the items shown in FIG. 9.

Figure 10A:
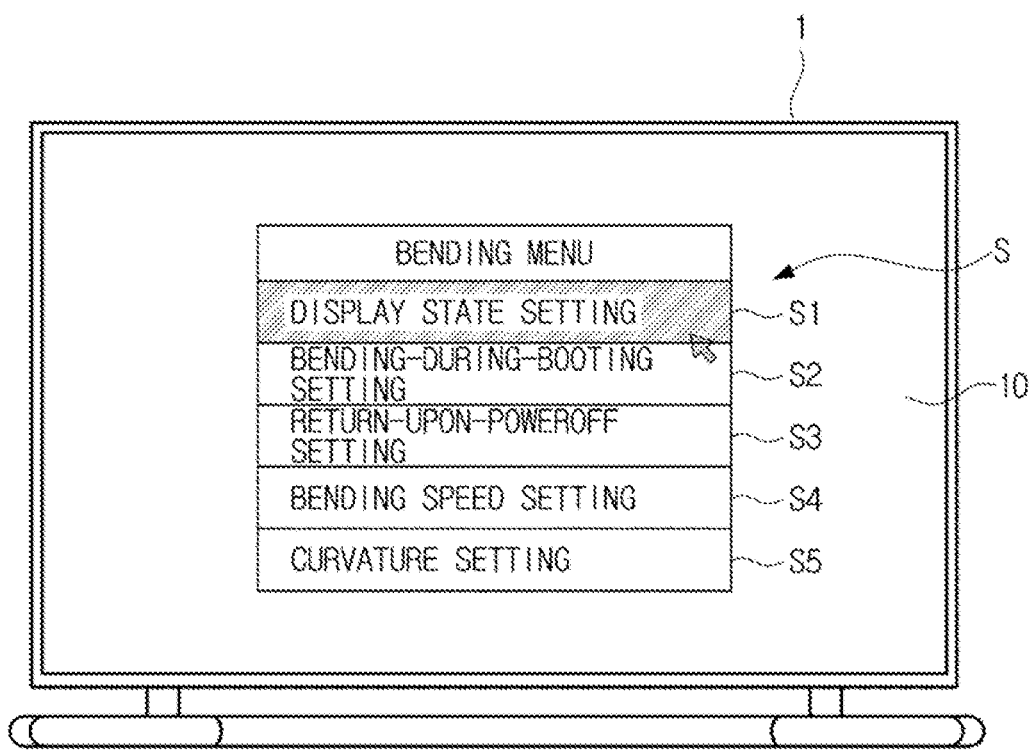
FIGS. 10A and 10B are diagrams illustrating setting a display state in a display apparatus according to an exemplary embodiment.
Figure 10B:
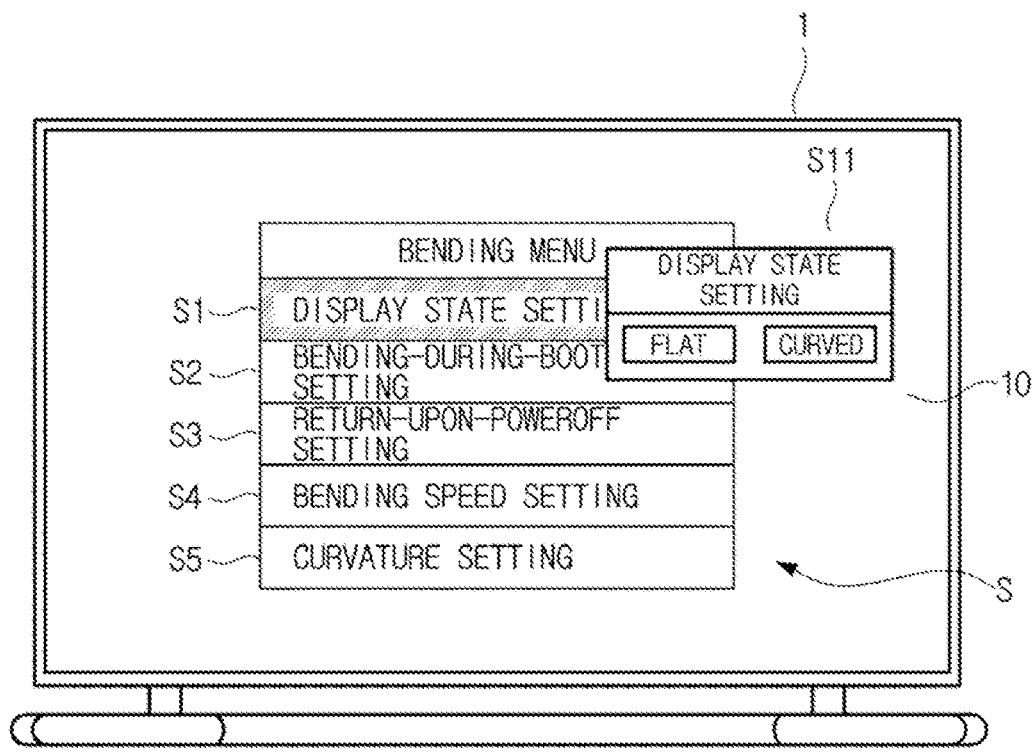

FIGS. 10A and 10B are diagrams illustrating setting a display state in the display apparatus according to an exemplary embodiment.

If a user wants to change a state of the display module 10 while viewing images through the display module 10, the user may input a bending command through the bending button 440 of the input unit 400 (see FIG. 7). In response to the command, the processor 100 (see FIG. 6B) may control the driver 20 (see FIG. 6B) to transform the display module 10 into a curved state or a flat state.

In some examples, the user may input a command for setting a state of the display module 10 through the bending setting window S. For example, if the bending setting window S is displayed, the input unit 400 may receive a command of selecting the display state setting item 51 from a user. In FIG. 10A, an example in which a user selects the display state setting item 51 is shown.

Figure 11A:
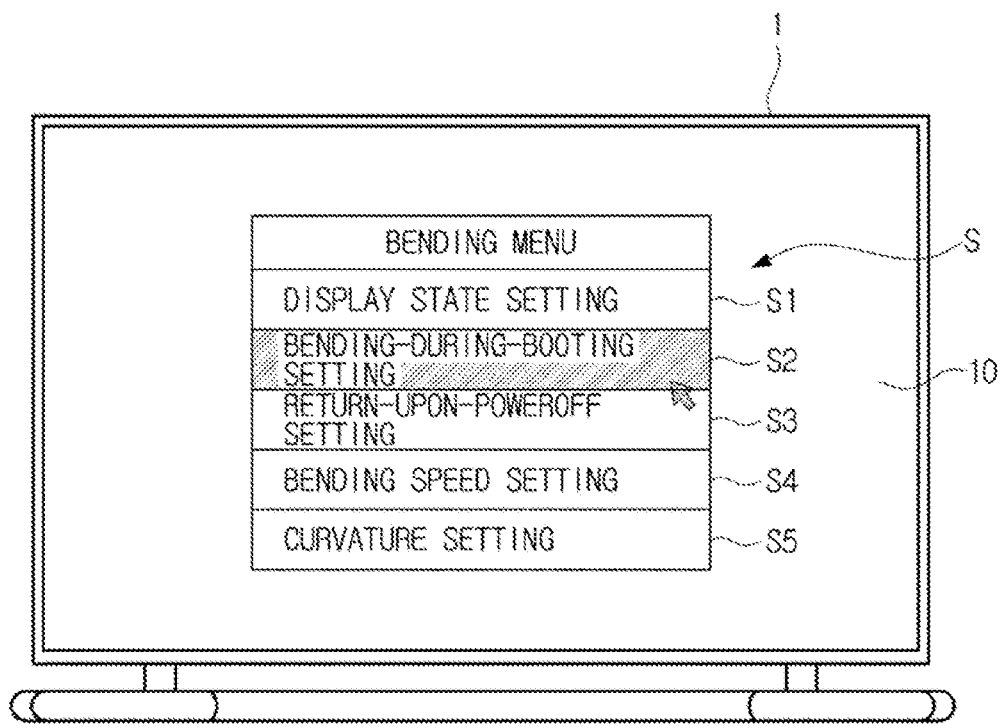
FIGS. 11A and 11B are diagrams illustrating setting whether to bend during booting in a display apparatus according to an exemplary embodiment.
Figure 11B:
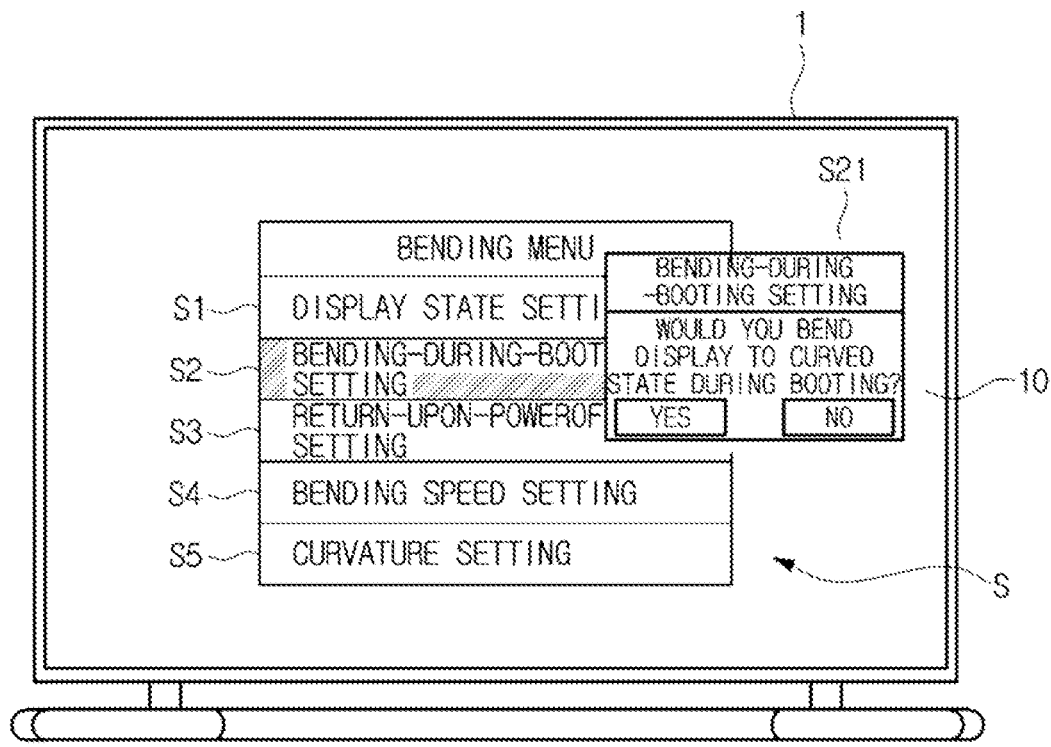

The display module 10 may display a display state setting window S11 in response to a user command. If the display state setting window S11 is displayed as shown in the example of FIG. 10B, the user may set a display state of the display apparatus 1 such that the display apparatus may be transformed to one of a curved state and a flat state during booting. Also, the user may change the state of the display module 10 while watching images through the display apparatus 1. FIGS. 11A and 11B are diagrams illustrating setting whether to bend upon booting in the display apparatus according to an exemplary embodiment.

While the bending setting window S is displayed, the input unit 400 may receive a command from a user for selecting the bending setting item S2. FIG. 11A illustrates an example in which the user selects the bending setting item S2.

Referring to FIG. 11B, the display module 10 may display a bending setting window S21 in response to the user's command. While the bending setting window S21 is displayed as shown in FIG. 11B, the input unit 400 may receive a command for setting whether to bend the display apparatus 1 during booting. Accordingly, if bending during booting is selected by a user's input, the user is able to cause the display module 10 to be transformed to a curved state during booting.

For example, a time period during which bending is performed according to the setting may include a time at which booting starts, a time at which booting is completed, or an arbitrary time within a time period for which booting is performed. For example, the period of time during which bending is performed may correspond to at least one booting step of a booting sequence, or may be included in at least one step of the booting steps.

Figure 12A:
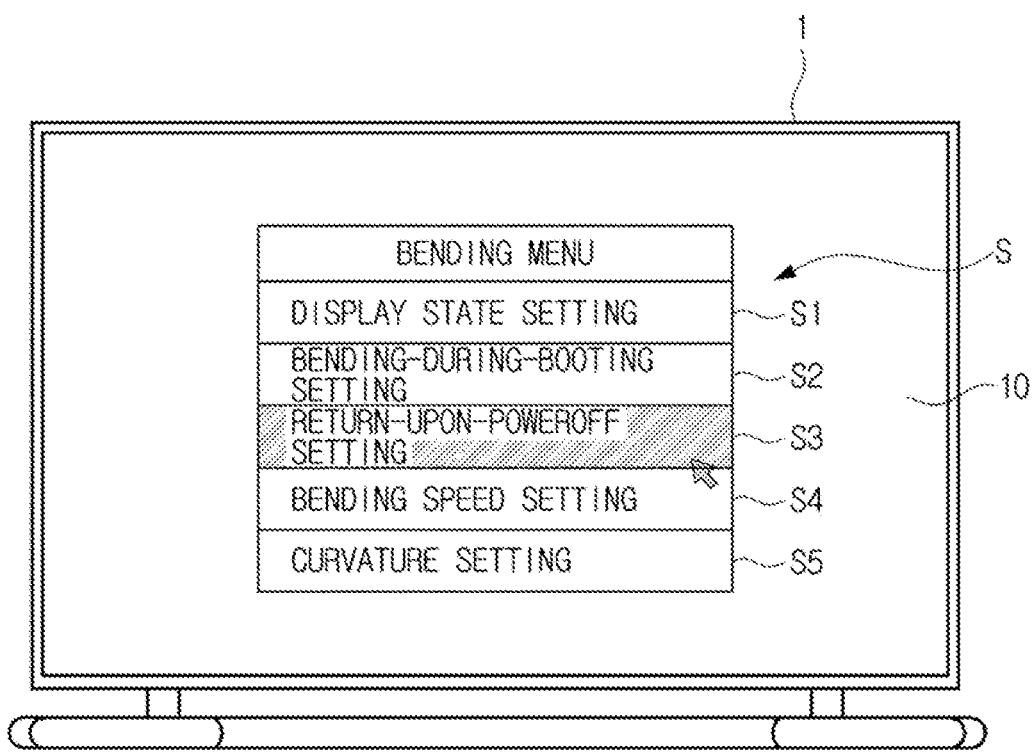
FIGS. 12A and 12B are diagrams illustrating setting whether to return upon power-off in a display apparatus according to an exemplary embodiment.
Figure 12B:
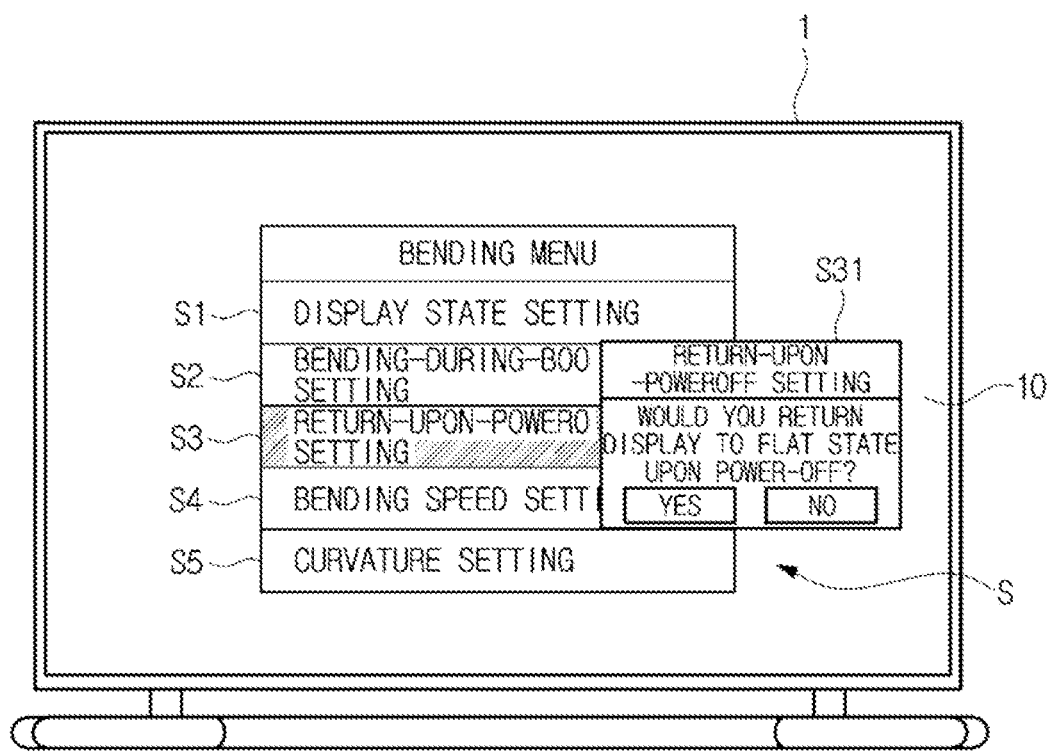

FIGS. 12A and 12B are diagrams illustrating setting whether to return upon power-off in the display apparatus according to an exemplary embodiment.

While the bending setting window S is displayed, the input unit 400 may receive a command from a user for selecting the return setting item S3 for setting whether to return upon power-off. FIG. 12A illustrates an example in which a user selects the return setting item S3.

As shown in FIG. 12B, the display module 10 may display a return setting window S31 in response to the user's command. While the return setting window S31 is displayed as shown in FIG. 12B, the input unit 400 may receive a command for setting whether to return upon power-off. For example, the input unit 400 may receive a command for setting whether to return the display module 10 from the curved state to the flat state upon power-off. Therefore, based on a user's input, the user can return the display module 10 to the flat state upon power-off or maintain the display module 10 in the curved state even upon power-off, according to his/her selection.

FIGS. 13A to 13D are diagrams illustrating setting a bending speed in the display apparatus according to an exemplary embodiment.

Figure 13A:
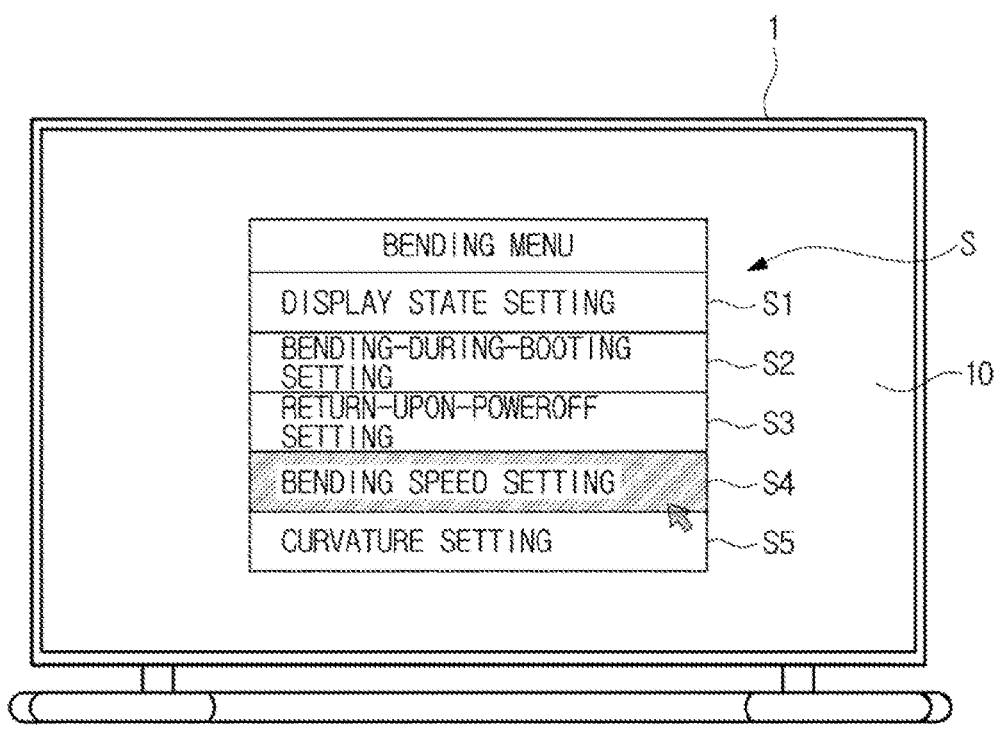
FIGS. 13A to 13D are diagrams illustrating setting a bending speed in a display apparatus according to an exemplary embodiment.

While the bending setting window S is displayed, the input unit 400 may receive a command fir selecting the bending speed setting item S4, from a user. FIG. 13A illustrates an example in which a user selects the bending speed setting item S4.

The display module 10 may display a bending speed setting window S41 in response to the user's command. While the bending speed setting window S41 is displayed as shown in FIG. 13B, the input unit 400 may receive a command for setting a variable speed at which the display module 10 bends.

Figure 13B:
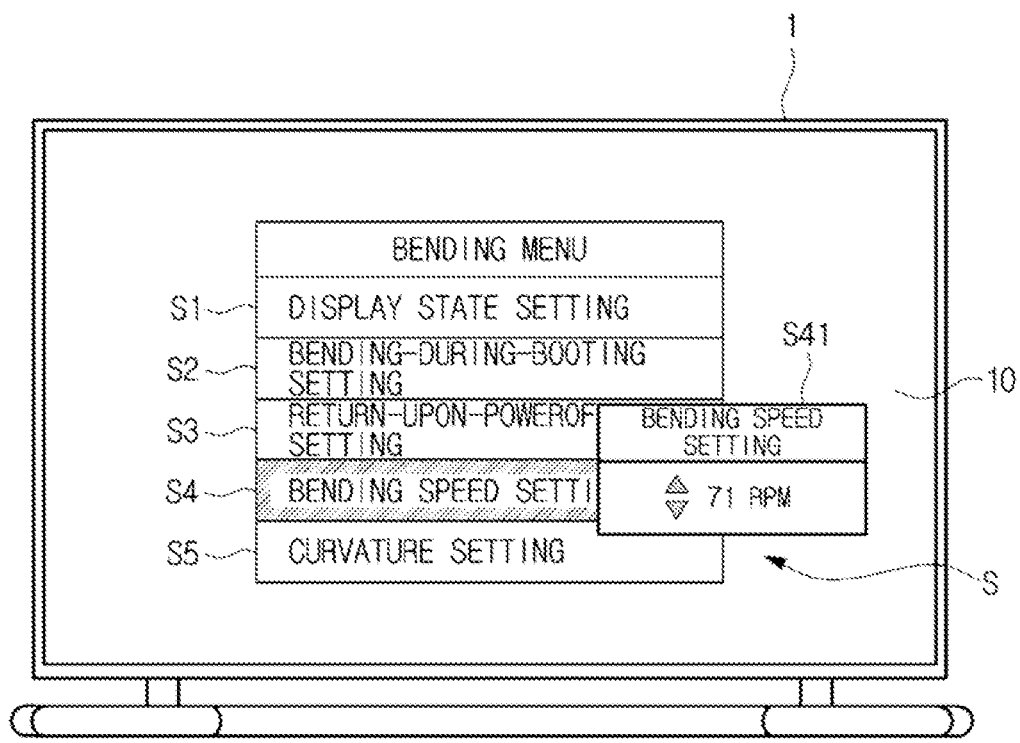
Figure 13C:
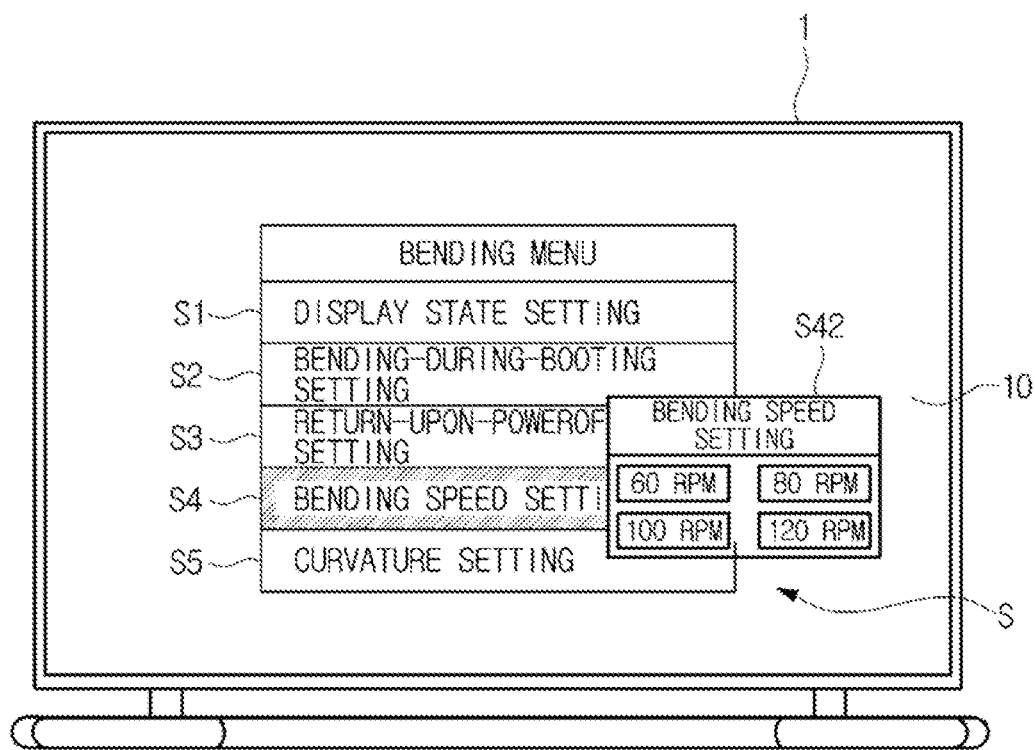

In some examples, a bending speed setting window S42 including a plurality of speed values may be displayed, as shown in the example of FIG. 13C. In this case, the user may input a command for selecting one of the displayed speed values as a bending speed value for the display module 10. In FIG. 13C, the bending speed setting window S42 displays four speed values that the user can select as a bending speed value of the display module 10.

Figure 13D:
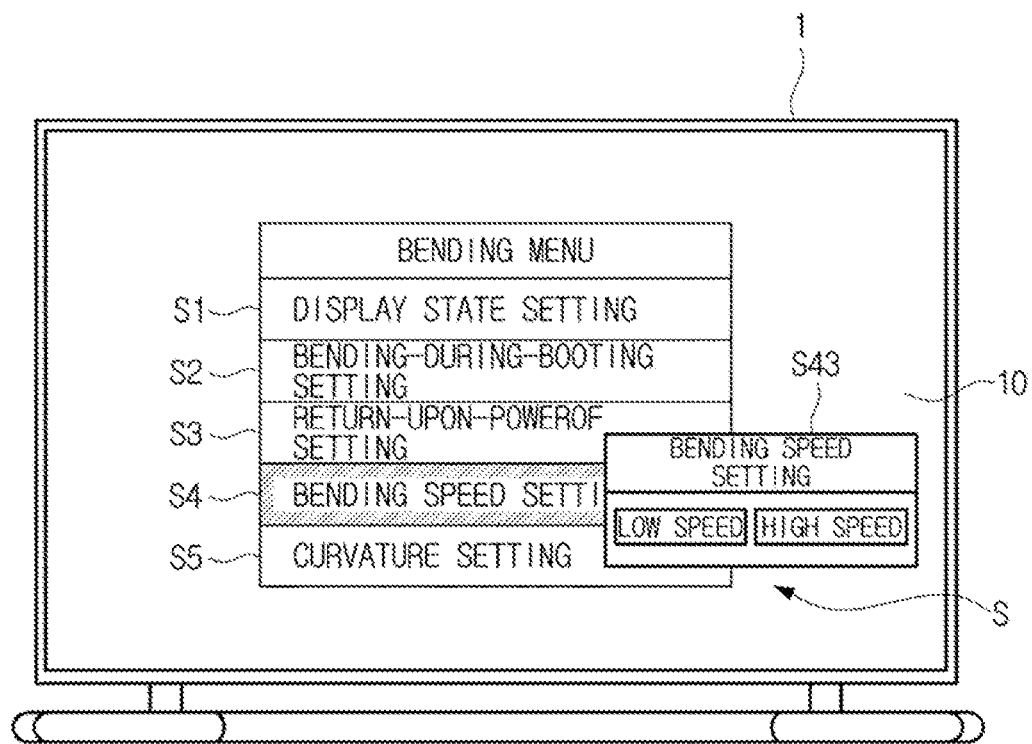

Referring to FIG. 13D, as another example, a bending speed setting window S43 may include bending speed levels of "low-speed" and "high-speed" which may be displayed so that a user can select a speed level corresponding to a "low-speed" or a "high-speed".

In FIGS. 13B and 13C, the bending speed is represented as revolutions per minute (RPM), however, the bending speed may be represented as levels corresponding to RPM sections. As another example, time periods that it will take for the curvature of the display module 10 to perform the bend to a target curvature may be displayed.

As another example, it is also possible to set different speed levels according to areas that are bent, or to set different speed levels over time for which bending may be performed.

FIGS. 14A to 14D are diagrams illustrating setting a target curvature of the display module in the display apparatus according to an exemplary embodiment.

Figure 14A:
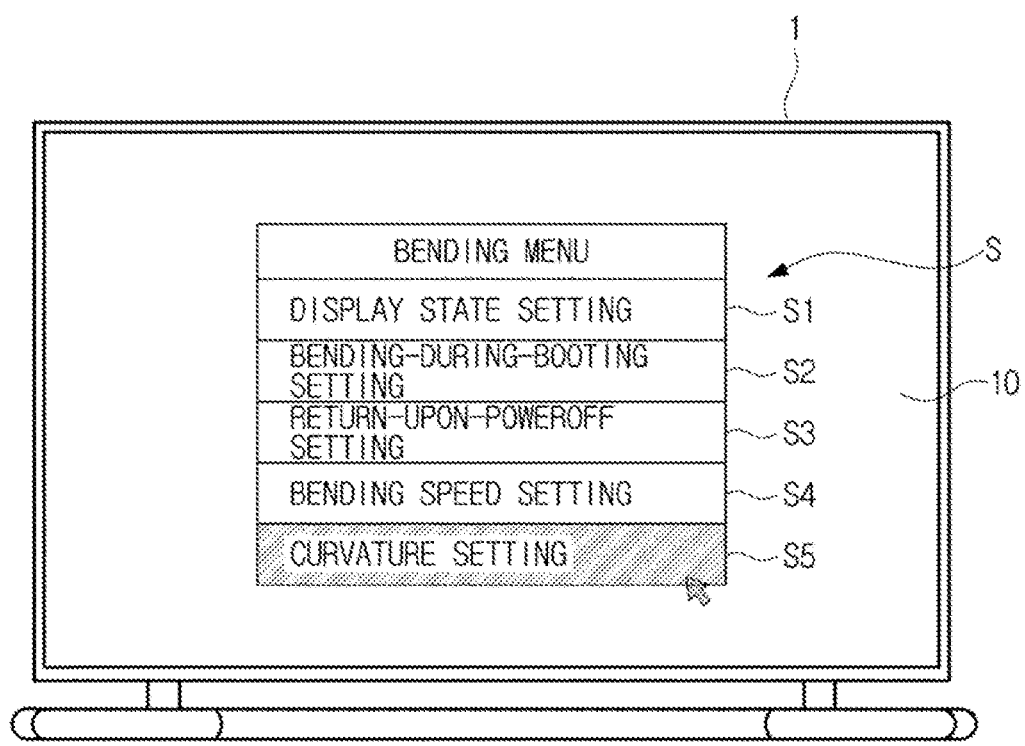
FIGS. 14A to 14D are diagrams illustrating setting a target curvature of a display module in a display apparatus according to an exemplary embodiment.

While the bending setting window S is displayed, the input unit 400 may receive a command for selecting the target curvature setting item S5, from a user. FIG. 14A illustrates an example in which a user selects the target curvature setting item S5.

Figure 14B:
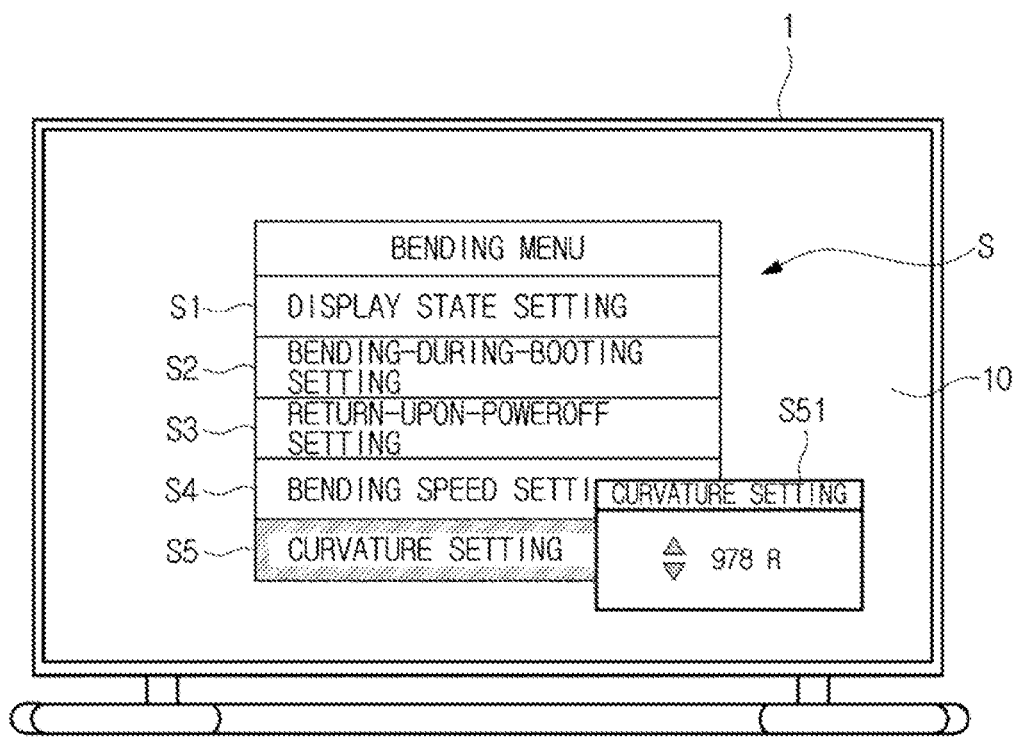

The display module 10 may display a target curvature setting window S51, in response to the user's command. While the target curvature setting window S51 is displayed as shown in FIG. 14B, the input unit 400 may receive a command for setting a target curvature of the display module 10.

Figure 14C:
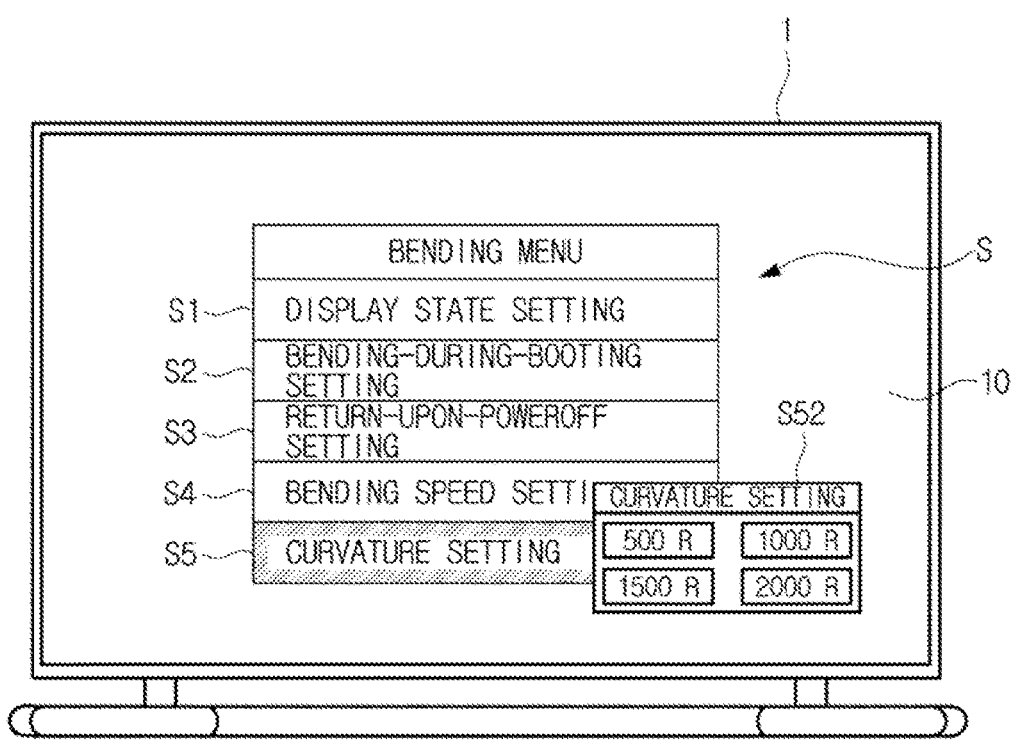

As another example, a target curvature setting window S52 including a plurality of curvatures may be displayed as shown in FIG. 14C. In this case, the user can input a command for selecting one of the displayed curvatures as a target curvature. In the example of FIG. 14C, the target curvature setting window S52 displays four curvatures that the user can select as a target curvature of the display module 10.

Figure 14D:
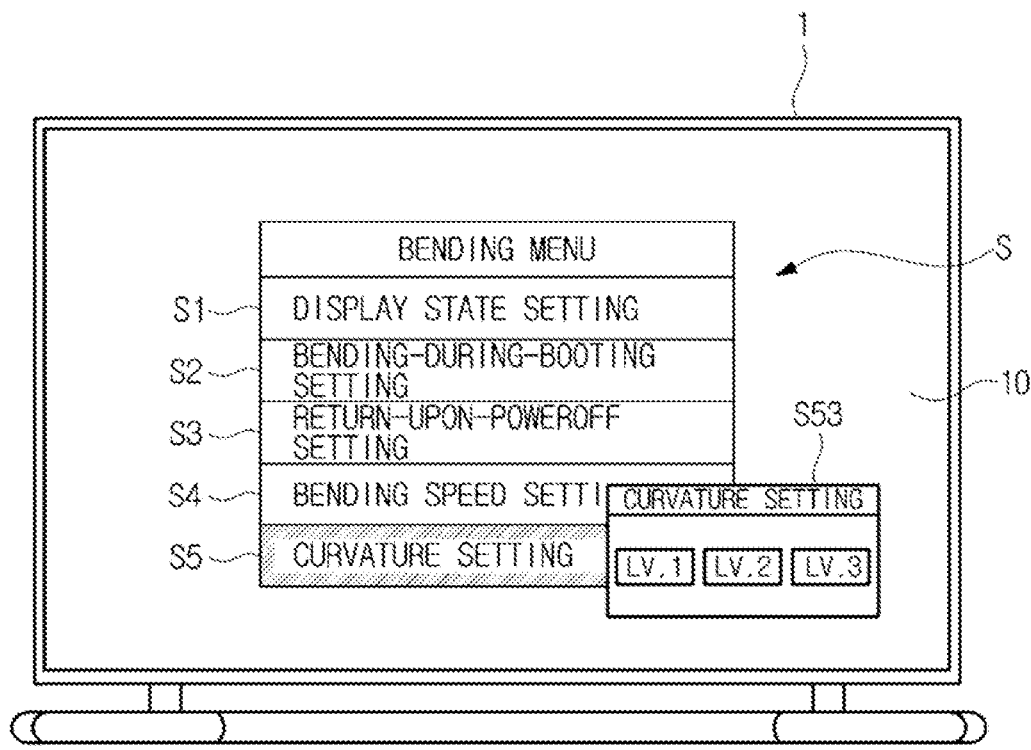

Referring to FIG. 14D, a target curvature setting window S53 that includes curvature levels of Lv. 1, Lv. 2, and Lv. 3 may be displayed so that a user can select a curvature corresponding to one of the levels. In FIGS. 14B and 14C, curvatures are represented as numerals, however, as another non-limiting example the curvatures may be represented as levels corresponding to curvature sections.

According to one or more exemplary embodiments, if a user selects a bending speed and a target curvature, user convenience may be improved because the user can further modify and adjust a display environment according to a user's desires.

Until now, a method for setting bending of the display module 10 through the bending setting window S has been described. The content of the bending settings may be stored as corresponding setting values in the storage unit 200, for example, in the second storage unit 220 (see FIG. 6B). Thereafter, if a power-on signal is input to perform booting, the processor 100 may check the setting values that are stored in the storage unit 200 to automatically control the curvature of the display module 10.

Referring again to FIGS. 6A and 6B, the processor 100 may control the driver 20 to change a curvature of the display module 10 according to settings as described above, during booting. As a non-limiting example, the processor 100 may further include a driving controller 130 to control power that is supplied to the driver 20.

Figure 15A:
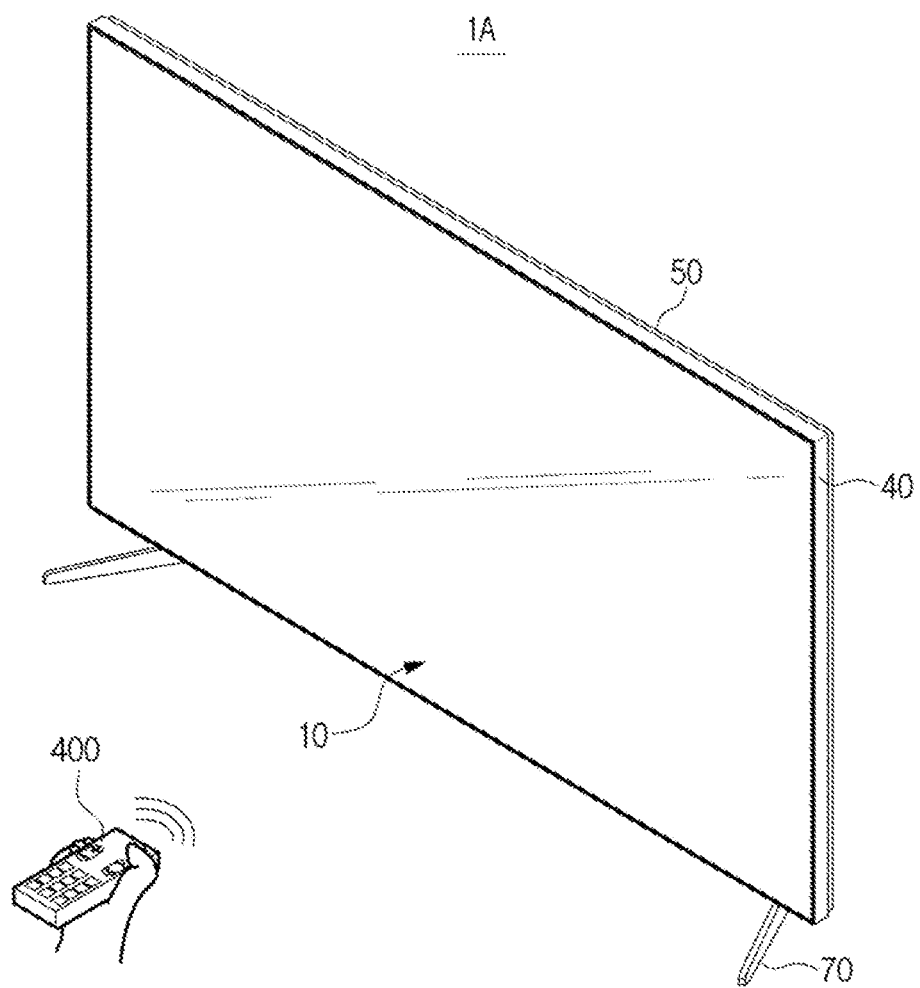
FIGS. 15A, 15B, and 15C are diagrams illustrating bending a display module during booting in a display apparatus according to an exemplary embodiment.
Figure 15B:
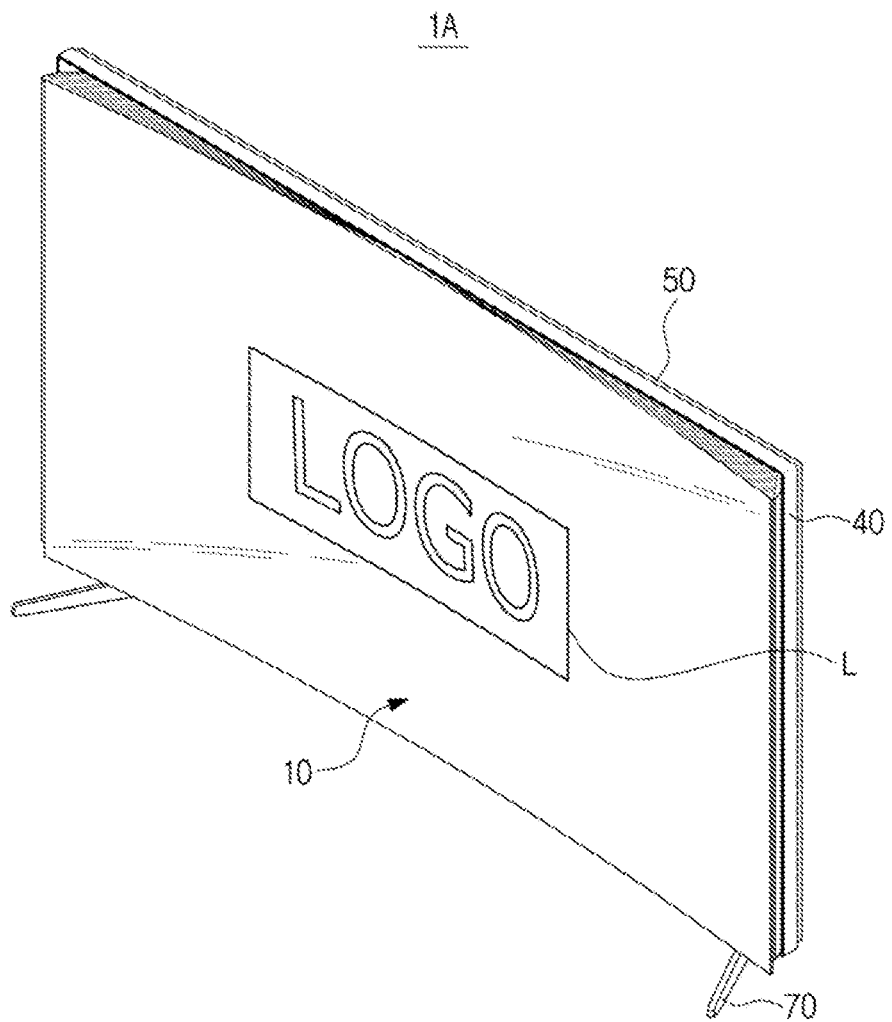
Figure 15C:
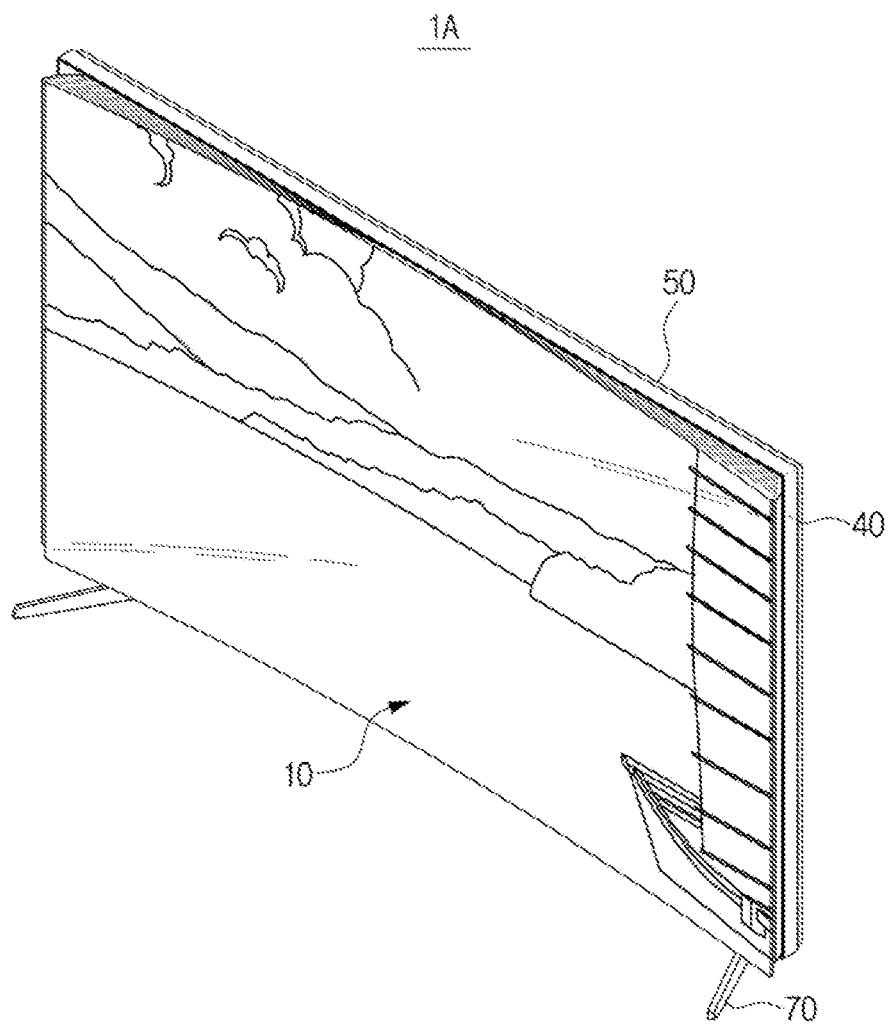

FIGS. 15A, 15B, and 15C are diagrams illustrating bending the display module during booting in the display apparatus according to an exemplary embodiment.

Referring to FIG. 15A, a user may input a command for supplying power P to the display apparatus 1 that is powered off.

For example, if a power-on signal is transferred to the display apparatus 1 according to the user's command, the processor 100 may perform booting according to a predetermined booting sequence. During the booting, the display module 10 may display a screen informing the user that booting is being performed. For example, the display module 10 may display a logo of a manufacturing company. At the same time, the driving controller 130 may control the driver 20 to bend the display module 10 during booting. In order to control the driver 20, the driving controller 130 may supply power to the driver 20 so that both lateral edges of the display module 10 move forward, as shown in FIG. 15B.

According to one or more of the exemplary embodiments, the bending of the display module 10 and the booting of the display apparatus including the display module 10 may be performed simultaneously. For example, simultaneously may refer to the bending of the display module 10 being performed during at least a portion of the booting process of the display apparatus being performed. As another example, at least a portion of the booting process of the display apparatus may be performed during the bending of the display module 10.

Because a bending speed and a target curvature may be set as described above, the driving controller 130 may control the driver 20 to bend the display module 10 according to the settings. For example, the driver 20 may bend the display module 10 at a predetermined speed. Also, the driver 20 may complete the bending of the display module 10 when the curvature of the display module 10 arrives at a target curvature.

In order to bend the display module 10 at a predetermined speed, the driving controller 130 may supply a power level corresponding to the predetermined speed to the driver 20. For example, the higher predetermined speed, the greater the amount of power level to be supplied corresponding to the predetermined speed. Also, if the curvature of the display module 10 arrives at a predetermined curvature, the driving controller 130 may stop supplying power to the driver 20.

According to one or more exemplary embodiments, when booting of the display apparatus is complete, the display module 10 may display images while the display module 10 is already in a curved state. As a result, the user can see images through the display module 10 that is in the curved state in an amount of time corresponding to the booting process of the display apparatus.

In FIGS. 15A to 15C, the display module 10 is transformed to a curved state during booting after power P is applied as shown. As another example, the driving controller 130 may control the driver 20 to transform the display module 10 to a flat state upon power-off.

As described above with reference to FIGS. 12A and 12B, a user may set the display module 10 such that the display module 10 returns to a flat state upon the display apparatus being powered-off. In this case, if a user inputs a power-off signal through the power button 410 of the input unit 400, the driving controller 130 may control the driver 20 to return the display module 10 from a curved state to a flat state, in response to the power-off signal.

If the display module 10 is transformed to the flat state upon power-off, the surface area of the display apparatus 1 may be reduced to make better use of space. That is, the display may be returned to a flat state to reduce the overall depth occupied by the display module.

Referring again to FIGS. 6A and 6B, while the curvature of the display module 10 is changing, the processor 100 may control the display apparatus 1 to inform a user that the curvature of the display module 10 is changing.

Figure 16A:
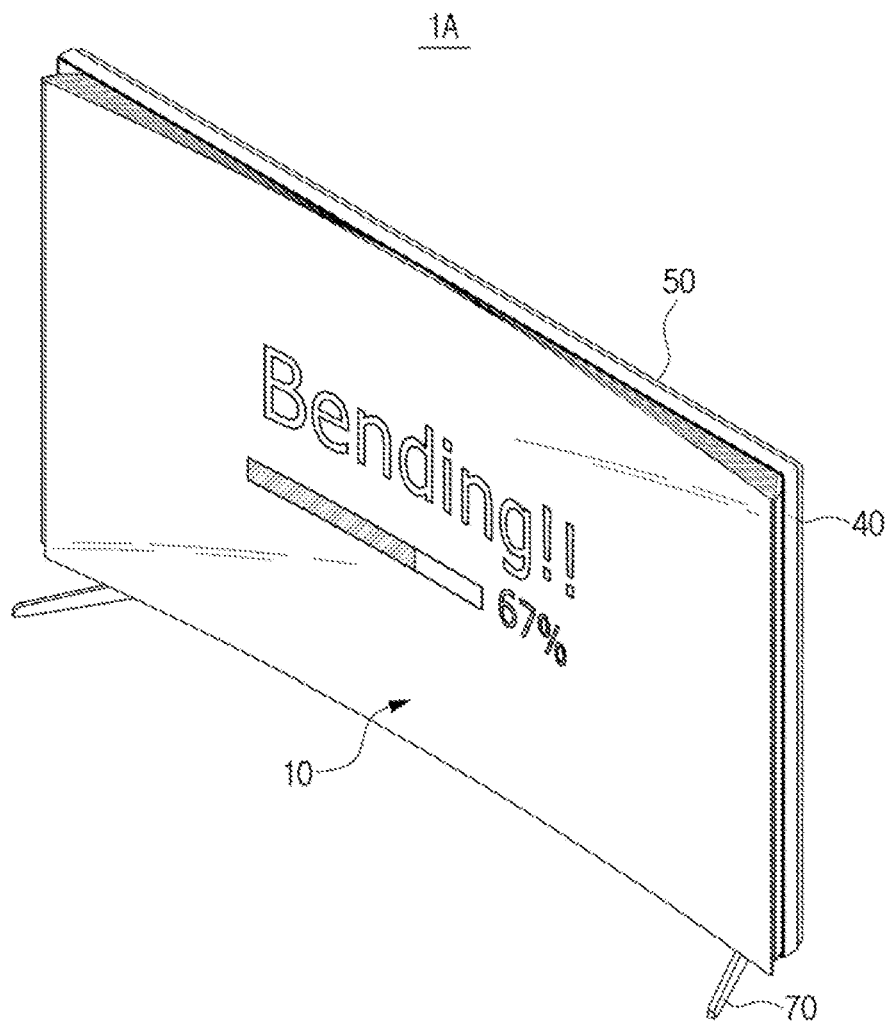
FIGS. 16A and 16B are diagrams illustrating examples of informing that a display module is being bent in a display apparatus according to an exemplary embodiment.
Figure 16B:
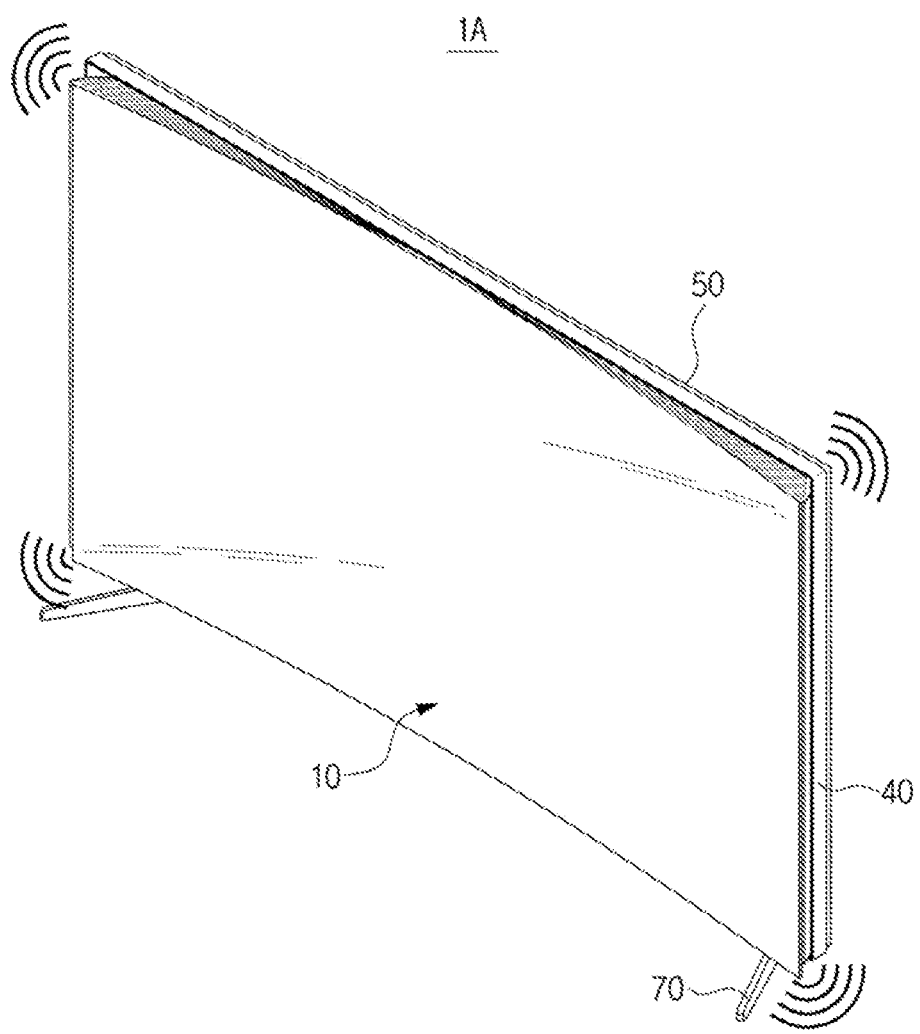

FIGS. 16A and 16B are diagrams illustrating examples of informing that the display module 10 is being bent in the display apparatus according to an exemplary embodiment.

For example, the processor 100 may visually inform a user that the display module 10 is being bent. More specifically, the display module 10 may display a screen informing that the display module 10 is being bent, under the control of the processor 100. As shown in FIG. 16A, the display module 10 displays text which recites "Bending!!" to inform a viewer that the display module 10 is being bent.

Also, in this example the display module 10 displays a progress of the bending operation together with the text "Bending!!". In FIG. 16A, the display module 10 may show the progress of bending as a percentage. For example, the percentage value may refer to a current curvature with respect to a predetermined target curvature.

Alternatively, the processor 100 may provide an audio signal informing the user that the display module 10 is being bent. More specifically, the sound output unit 25c may output sound informing that the display module 10 is being bent, under the control of the processor 100. As shown in FIG. 16B, the sound output unit 25c of the display apparatus 1 outputs a predetermined sound. For example, the sound output unit 25c may output a predetermined melody while the display module 10 is being bent. As another example, the sound output unit 25c may output a beep sound at regular time intervals. As another example, the sound output unit 25c may output beep sound at different time intervals according to curvatures. By outputting a beep sound, the user may easily determine that the display module 10 is being bent.

FIGS. 17 to 21 are diagrams illustrating various exemplary embodiments of periods of time taken for the display module 10 to be bent in the display apparatus according to an exemplary embodiment.

Figure 17:
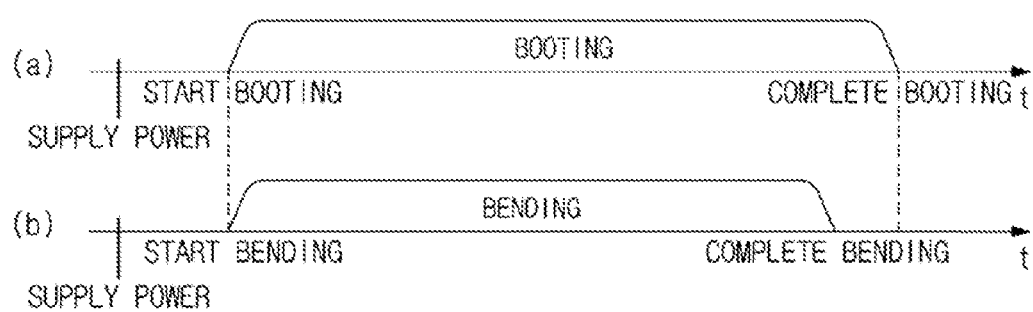
FIG. 17 is a view illustrating a period of time during which curvature deformation is performed with respect to a period of time during which booting is performed according to an exemplary embodiment.

FIG. 17 is a view illustrating a period of time during which curvature deformation is performed with respect to a period of time during which booting is performed according to an exemplary embodiment. More specifically, (a) of FIG. 17 is a graph illustrating a period of time during which booting is performed after power is applied, and (b) of FIG. 17 is a graph illustrating a period of time during which bending is performed after power is applied.

When power P is applied to the display apparatus 1, the processor 100 may perform booting according to a predetermined booting sequence. As shown in (a) of FIG. 17, booting may start after power P is applied. As another example, booting may start at the same time when power P is applied.

The processor 100 may generate a booting control signal to control booting. For example, while booting is performed by the processor 100, the driver 20 may bend the display module 10. Referring to FIG. 17, bending may be completed before booting is completed. In this case, because the driver 20 completes bending the display module 10 during booting, the display module 10 may display images in a curved state immediately after booting is completed. In FIG. 17, bending starts when booting starts. As another example, bending may start after booting starts.

Figure 18:
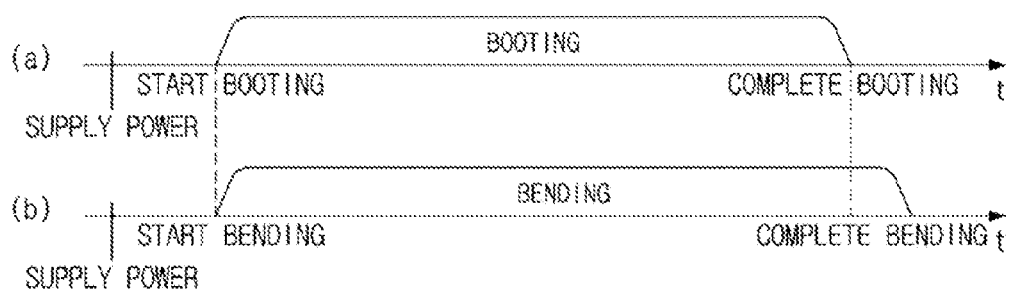
FIG. 18 is a view illustrating a period of time during which curvature deformation is performed with respect to a period of time during which booting is performed according to another exemplary embodiment.

FIG. 18 is a view illustrating a period of time during which curvature deformation is performed with respect to a period of time during which booting is performed according to another exemplary embodiment. More specifically, (a) of FIG. 18 is a graph illustrating a time period during which booting is performed after power is applied, and (b) of FIG. 18 is a graph illustrating a time period during which bending is performed after power is applied.

Referring to FIG. 18, a time at which bending starts may also be a time at which booting starts or an arbitrary time within a time period for which booting is performed, as described in the examples of FIGS. 16A and 16B.

However, as shown in FIG. 18, bending may continue to be performed even after booting is completed. Accordingly, even while images are displayed through the display module 10 after booting is completed, bending may continue to be performed.

Figure 20:
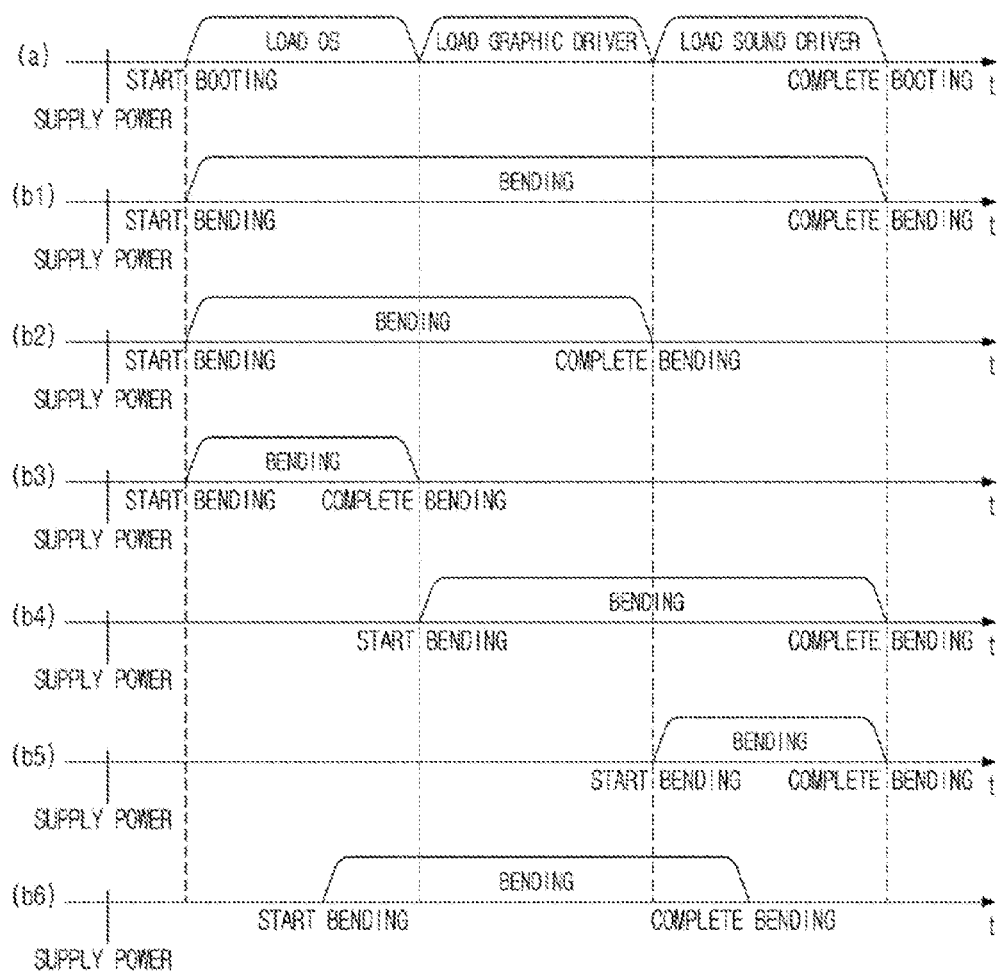
FIG. 20 illustrates graphs for describing various other exemplary embodiments of bending time periods of a booting sequence that is performed by a display apparatus.
Figure 21:
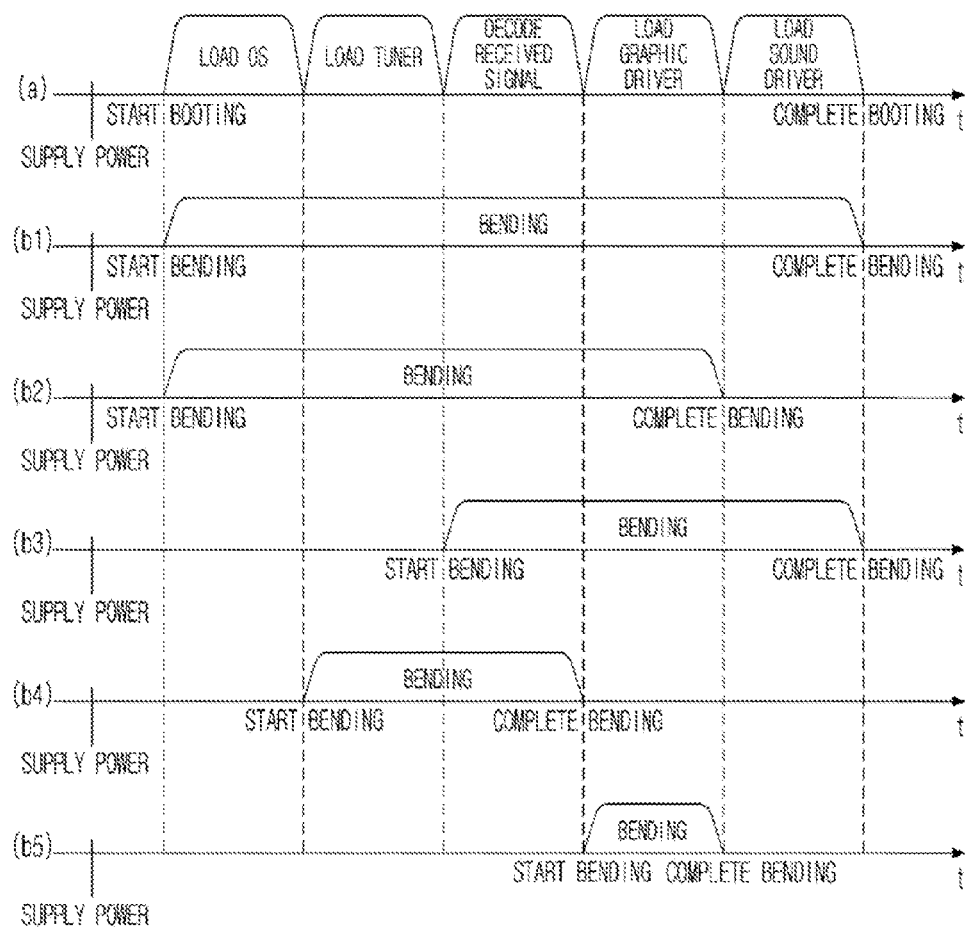
FIG. 21 illustrates graphs for describing various other exemplary embodiments of bending time periods of a booting sequence that is performed by a display apparatus.

Hereinafter, various exemplary embodiments of bending time periods according to various examples of booting sequences are described with reference to FIGS. 19 to 21. For convenience of description, it is assumed that bending is completed during booting. Also, a booting sequence that does not include steps of loading a BIOS, initializing hardware of the display apparatus 1, and loading a bootloader is assumed. Therefore, it should be appreciated that other booting steps may be included with these examples. However, FIGS. 19 to 21 show examples of bending time periods.

Figure 19:
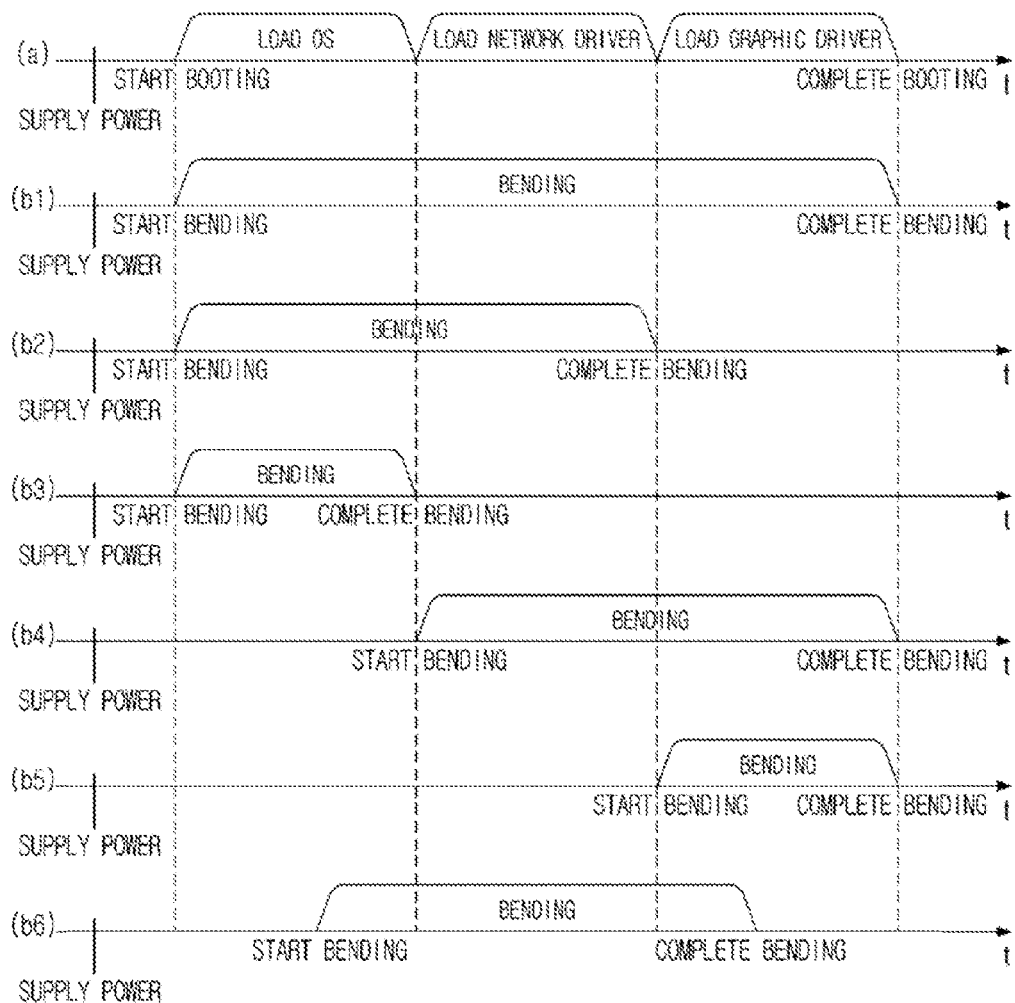
FIG. 19 illustrates graphs for describing various exemplary embodiments of bending time periods of a booting sequence that is performed by a display apparatus.

FIG. 19 illustrates graphs of bending time periods according to an exemplary embodiment of a booting sequence that is performed by the display apparatus 1. The booting sequence of FIG. 19 may be applied when the display apparatus 1 displays an Internet screen after power P is applied to the display apparatus 1.

(a) of FIG. 19 is a graph illustrating an embodiment of a time at which booting starts after power is applied.

When power P is applied, the processor 100 (see FIG. 6B) may generate a booting control signal for loading OS. In response to the OS being loaded according to the booting control signal, the processor 100 may generate a booting control signal for loading a network driver. Then, if the network driver is loaded according to the booting control signal, the processor 100 may generate a booting control signal for loading a graphic driver. If the graphic driver is loaded, the processor 100 may complete booting. It should also be appreciated that the order of steps of the booting may be in a different order than that which is shown in this example.

According to one or more exemplary embodiments, the processor 100 may transfer a bending control signal to the driver 20 when booting is performed, in order to bend the display module 10.

As shown in (b1) of FIG. 19, a time at which bending begins is equal to a time at which booting starts. As a result, bending may be performed while booting is performed. Also, in this example when the booting is completed, the bending may also be completed.

As another example, although a time at which bending starts may be equal to a time at which booting starts, the bending may be completed before the booting is completed. For example, a time at which bending is completed may be equal to a time at which one of steps of a booting sequence is completed or while one of the other booting steps is still being performed.

For example, as shown in the example of (b2) of FIG. 19, bending may be completed at a time at which loading the network driver is completed. Alternatively, as shown in the example of (b3) of FIG. 19, bending may be completed at a time at which loading of the OS is completed.

As another example, a time at which bending is completed may be equal to a time at which booting is completed, however, the bending may begin after the booting has begun being performed. For example, a time at which bending starts may be equal to a time at which one of steps of a booting sequence starts.

For example, as shown in (b4) of FIG. 19, bending may begin at a time at which loading the network driver begins. Also, as shown in (b5) of FIG. 19, bending may start at a time at which loading the graphic driver starts.

As another example, bending may begin at an arbitrary time within a time period during which booting is performed, and the bending may be completed at another arbitrary time within the time period during which the booting is performed. Referring to (b6) of FIG. 19, bending may begin when the OS is being loaded, and may be completed when a graphic driver is being loaded.

FIG. 20 illustrates graphs of bending time periods according to another exemplary embodiment of a booting sequence that is performed by the display apparatus 1. The booting sequence of FIG. 20 may be applied when the display apparatus 1 displays external image signals received from an external device after power P is applied to the display apparatus 1.

(a) of FIG. 20 illustrates an embodiment of a time at which booting starts after power is applied.

When power P is applied, the processor 100 may generate a booting control signal for loading OS. When the OS is loaded according to the booting control signal, the processor 100 may generate a booting control signal for loading a graphic driver. Then, if the graphic driver is loaded according to the booting control signal, the processor 100 may generate a booting control signal for loading a sound driver. As a result, if the sound driver is loaded, the processor 100 may complete booting.

The processor 100 may transfer a bending control signal to the driver 20 such that bending of the display module 10 may be performed during the booting, as described above with reference to FIG. 19.

As shown in the example of (b1) of FIG. 20, bending may begin at a time at which booting starts, the bending may be performed while the booting is performed, and the bending may be completed at a time at which the booting is completed.

As another example, a time at which bending begins may be equal to a time at which booting starts, however, the bending may be completed before the booting is completed. For example, as shown in (b2) of FIG. 20, bending may be completed at a time at which loading of the graphic driver is completed. Also, as shown in (b3) of FIG. 20, bending may be completed at a time at which loading of the OS is completed.

Also, although a time at which bending is completed may be equal to a time at which booting is completed, the bending may start when the booting has already begun being performed. For example, as shown in (b4) of FIG. 20, bending may start at a time at which loading of the graphic driver starts. Also, as shown in (b5) of FIG. 20, bending may start at a time at which loading of the sound driver starts.

As another example, bending may begin at an arbitrary time within a time period during which booting is performed, and may be completed at another arbitrary time within the time period during which the booting is performed. As shown in the example of (b6) of FIG. 20, bending may begin when the OS is being loaded, and may be completed when the sound driver is being loaded.

FIG. 21 illustrates graphs of bending time periods according to still another embodiment of a booting sequence that is performed by the display apparatus 1. The booting sequence of FIG. 21 may be applied when the display apparatus 1 displays a received broadcasting image signal after power P is applied to the display apparatus 1.

(a) of FIG. 21 shows an example of a time at which booting begins after power is applied.

When power P is applied, the processor 100 may generate a booting control signal for loading an OS. In response to the OS being loaded according to the booting control signal, the processor 100 may generate a booting control signal for loading a tuner. Then, the processor 100 may generate a booting control signal for decoding a received signal. When the received signal is decoded, the processor 100 may generate a booting control signal for loading a graphic driver. Finally, if a sound driver is loaded, booting may be completed.

According to one or more exemplary embodiments, the processor 100 may transfer a bending control signal to the driver 20 such that bending of the display module 10 may be performed during booting, as described above with reference to FIGS. 19 and 20.

As shown in (b1) of FIG. 21, bending may be performed throughout a period of time during which booting is performed.

In this example, a time at which bending starts is equal to a time at which booting starts. However, the bending may be completed before the booting is completed. For example, as shown in (b2) of FIG. 21, bending may be completed at a time at which loading the graphic driver is completed.

As another example, the bending may begin after the booting has begun to be performed. For example, as shown in (b3) of FIG. 21, bending may start at a time at which decoding the received signal starts.

As another example, bending may start at an arbitrary time that is within a period of time during which booting is performed, and may be completed at another arbitrary time within the period of time during which the booting is performed. As shown in (b4) of FIG. 21, bending may start when the tuner is being loaded, and may be completed when decoding the received signal is completed. As another example, as shown in (b5) of FIG. 21, bending may be performed when the graphic driver is loaded.

FIGS. 19 to 21 illustrate various examples of bending time periods according to various booting sequences. It should be appreciated that FIGS. 19 to 21 are merely for purposes of example, and bending may be performed at any time while booting is performed. Also, a time at which the bending is completed may be irrelevant to a time at which the booting is completed.

Figure 22:
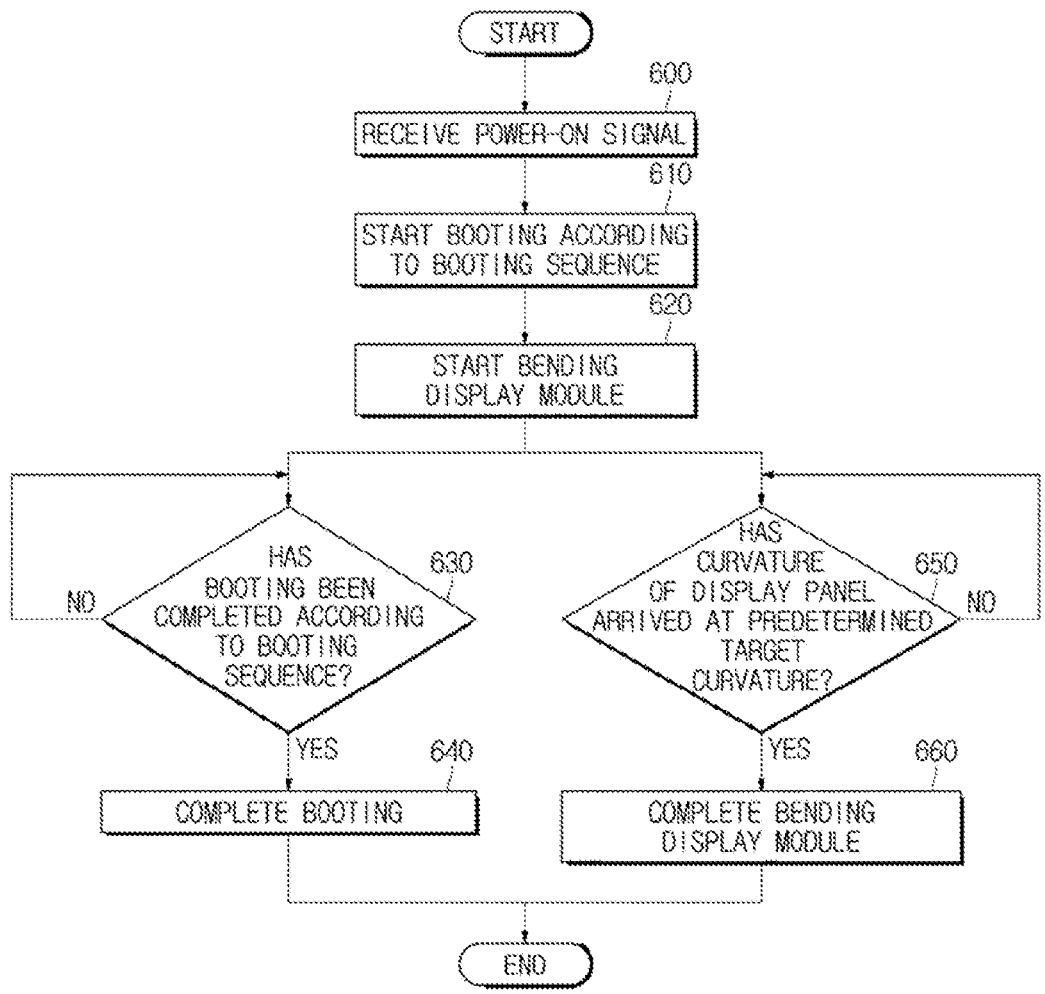
FIG. 22 is a flowchart illustrating a method of controlling a display apparatus when a power-on signal is received, according to an exemplary embodiment.

FIG. 22 is a flowchart illustrating a method of controlling the display apparatus 1 when a power-on signal is received, according to an exemplary embodiment.

Referring to FIG. 22, the display apparatus 1 receives a power-on signal, in operation 600. For example, the input unit 400 may receive a power-on command from a user, and transfer a power-on signal to the processor 100 according to the power-on command received from the user.

In response to the power-on signal, the processor 100 begins booting for normally operating the display apparatus 1, in operation 610. For example, the booting may be performed according to a predetermined booting sequence. The booting sequence may have been stored in the storage unit 200 that is included inside or outside the display apparatus 1, or may have been decided by hardware and/or software, in advance, by the processor 100.

When booting is performed according to a booting sequence, the processor 100 starts bending the display module 10, in operation 620. "When booting is performed" as described in various examples herein may include a time at which booting starts up to and including a time at which booting is completed.

The processor 100 may control booting and bending of the display module 10 in parallel. For example, the processor 100 may generate and transmit a booting control signal for controlling booting and independently transmit a bending control signal for controlling bending. Also, the two signals may be transmitted at the same time, transmitted in serial, or transmitted at arbitrary times.

Independently from bending, the processor 100 determines whether booting has been completed according to the booting sequence, in operation 630. For example, the determining may be performed in a loop. If the processor 100 determines that booting has not been completed according to the booting sequence, the processor 100 continues to perform booting.

On the other hand, if the processor 100 determines that booting has been completed according to the booting sequence, the processor 100 completes the booting, in operation 640.

Meanwhile, when the processor 100 bends the display module 10, the processor 100 determines whether the curvature of the display module 10 has arrived at a predetermined target curvature, in operation 650. For example, the determining may be performed in a loop. As an example, the target curvature may be decided by a user's input or by an internal calculation of the display apparatus 1, and stored in the storage unit 200.

If the processor 100 determines that the curvature of the display module 10 has not arrived at the predetermined target curvature, the processor 100 continues to bend the display module 10.

Meanwhile, if the processor 100 determines that the curvature of the display module 10 has arrived at the predetermined target curvature, the processor 100 completes bending of the display module 10, in operation 660.

Accordingly, the completing of the booting of the display apparatus and the completing of the bending of the display module 10 may be determined independently of each other.

Figure 23:
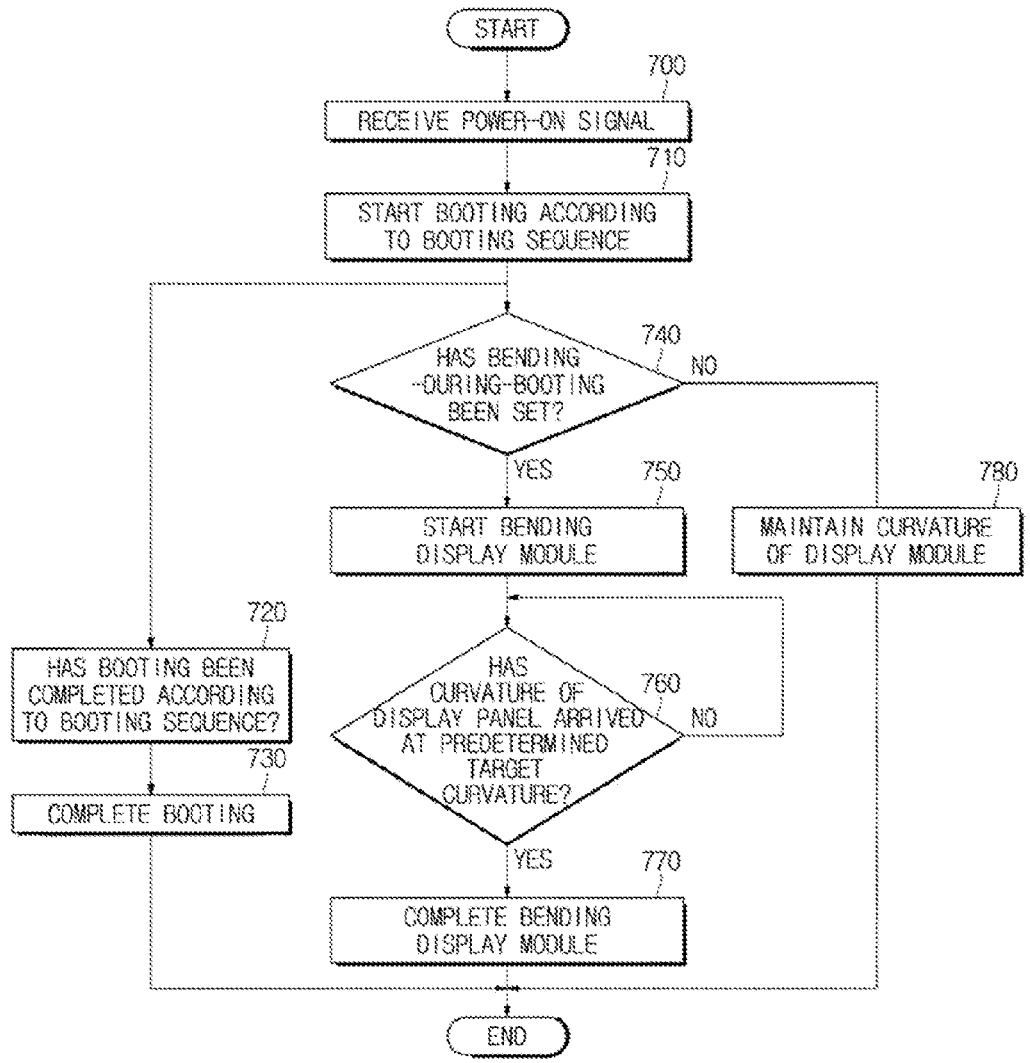
FIG. 23 is a flowchart illustrating a method of controlling a display apparatus when a power-on signal is received, according to another exemplary embodiment.

FIG. 23 is a flowchart illustrating a method of controlling the display apparatus 1 when a power-on signal is received, according to another exemplary embodiment.

Referring to FIG. 23, the display apparatus 1 receives a power-on signal, in operation 700. In response to the power-on signal, the processor 100 starts booting for normally operating the display apparatus 1, in operation 710.

When booting is performed according to a booting sequence, the processor 100 determines whether bending during booting has been set in advance, in operation 740.

If the processor 100 determines that bending during booting has been set in advance, the processor 100 begins bending the display module 10, in operation 750.

The processor 100 may control booting and bending of the display module 10 in parallel. That is, the processor 100 may generate and transmit a booting control signal for controlling the booting and a bending control signal for controlling the bending, independently.

Independent from bending, the processor 100 determines whether booting has been completed according to a booting sequence, in operation 720. If the processor 100 determines that booting has not been completed according to the booting sequence, the processor 100 continues to perform booting.

However, if the processor 100 determines that booting has been completed according to the booting sequence, the processor 100 completes booting in operation 730.

Meanwhile, when the processor 100 bends the display module 10, the processor 100 determines whether the curvature of the display module 10 has arrived at a predetermined target curvature, in operation 760. For example, the target curvature may be decided by a user's input or by an internal calculation of the display apparatus 1, and stored in the storage unit 200.

If the processor 100 determines that the display module 10 has not arrived at the predetermined target curvature, the processor 100 continues to bend the display module 10.

However, if the processor 100 determines that the display module 10 has arrived at the predetermined target curvature, the processor 100 completes bending of the display module 10, in operation 770.

Accordingly, the completing of the booting and the completing of the bending of the display module 10 may be determined independently.

Also, if the processor 100 determines that bending during booting has not been set, the processor 100 maintains a current curvature of the display module 10, in operation 780.

Figure 24:
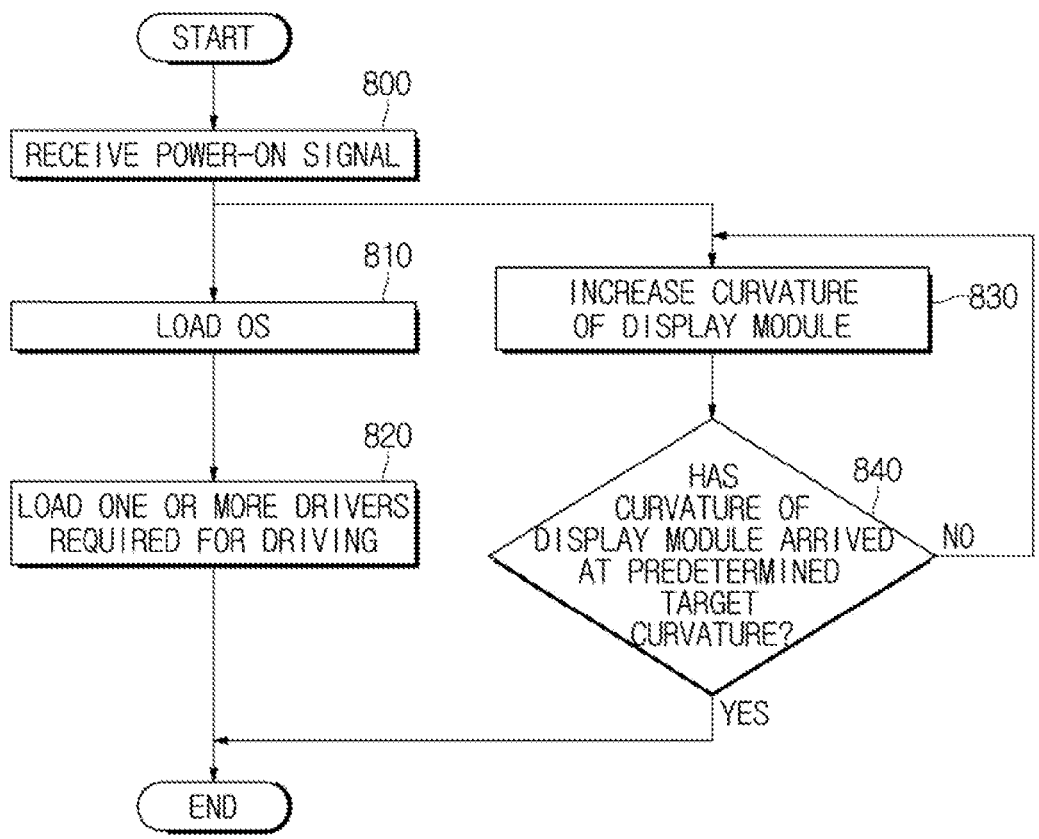
FIG. 24 is a flowchart illustrating another example of the method of FIG. 22 according to another exemplary embodiment.

FIG. 24 is a flowchart illustrating the method of FIG. 22 according to another exemplary embodiment. In the embodiment of FIG. 24, it is assumed that booting is performed according to a booting sequence of (1) loading an OS and (2) loading one or more drivers used for driving the display apparatus.

First, power may be applied to the display apparatus 1, in operation 800. For example, the input unit 400 may receive a power-on command from a user.

In response to the power-on command being received from the user, the display apparatus 1 may perform booting. For example, the display apparatus 1 may perform booting according to a predetermined booting sequence.

Here, the OS is loaded, in operation 810. In response to loading of the OS being completed, one or more drivers that are used for normally driving the display apparatus 1 are loaded, in operation 820. Herein, the one or more drivers for normally driving the display apparatus 1 may refer to one or more drivers that drive components of the display apparatus 1 to perform desired operation.

When booting is performed according to the booting sequence, the curvature of the display module 10 is gradually increased, in operation 830. Next a determination is made as to whether the display module 10 has arrived at a predetermined target curvature, in operation 840. If the display module 10 has not arrived at the predetermined target curvature, the curvature of the display module 10 may continue to increase. However, if the display module 10 has arrived at the predetermined target curvature, bending may be completed.

As such, bending of the display module 10 may be performed during booting such that the bending and the booting are performed in parallel. However, it should be appreciated that a time at which the bending is completed may be irrelevant to a time at which the booting is completed.

Figure 25:
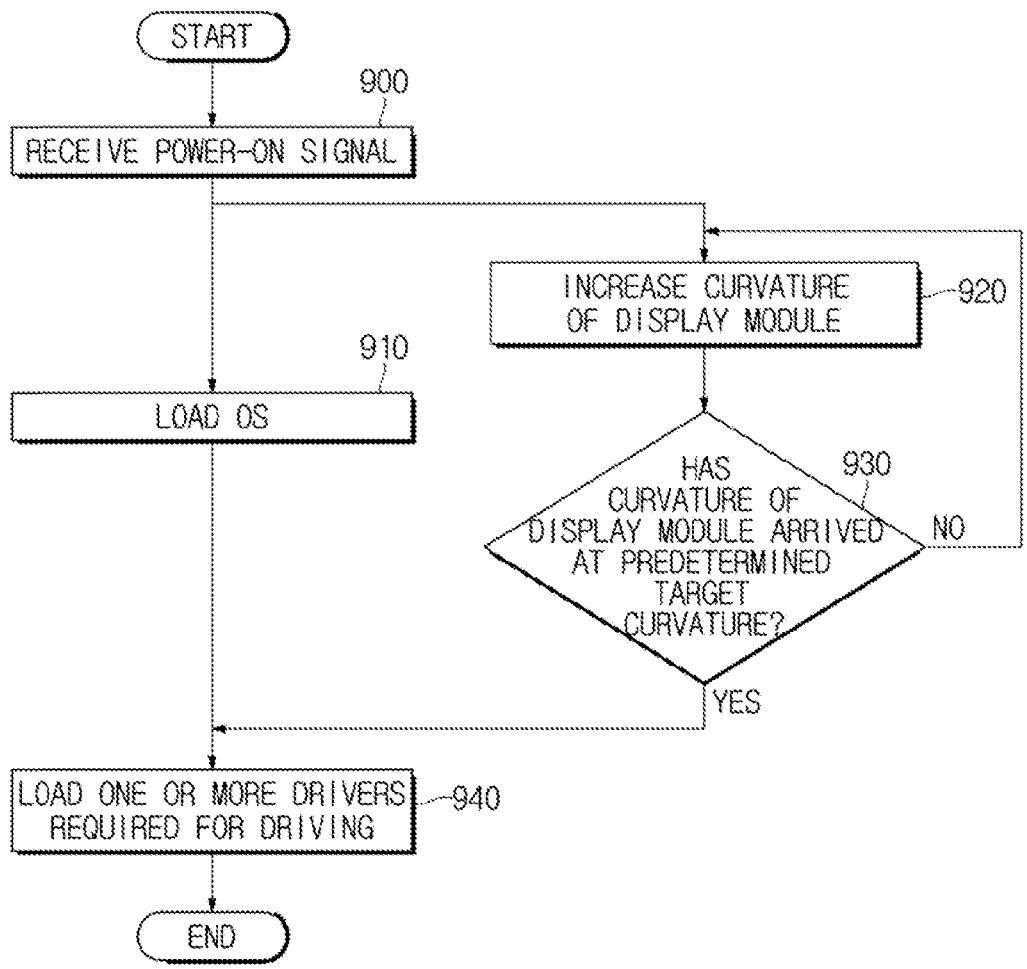
FIG. 25 is a flowchart illustrating another example of the method of FIG. 22 according to another exemplary embodiment.

FIG. 25 is a flowchart illustrating the method of FIG. 22 according to another exemplary embodiment. In the example of FIG. 25, it is assumed that booting is performed according to a booting sequence of (1) loading an OS and (2) loading one or more drivers for driving the display apparatus.

Referring to FIG. 25, power is applied to the display apparatus 1, in operation 900. For example, the input unit 400 may receive a power-on command from a user. In response to the power-on command received from the user, the display apparatus 1 may perform booting. For example, the display apparatus 1 may perform booting according to a predetermined booting sequence.

More specifically, the OS is loaded, in operation 910. When booting is performed according to the booting sequence, the curvature of the display module 10 is increased gradually, in operation 920. In the example of FIG. 25, when OS is being loaded, bending may be performed.

For example, while the curvature of the display module 10 increases gradually, a determination is made as to whether the curvature of the display module 10 has arrived at a predetermined target curvature, in operation 930.

If the curvature of the display module 10 has not arrived at the predetermined target curvature, the curvature of the display module 10 may continue to increase. However, if the curvature of the display module 10 has arrived at the predetermined target curvature, bending is finished, and the process may proceed to the next booting step.

If loading of the OS and bending of the display module 10 are completed, one or more drivers for normally driving the display apparatus 1 are loaded, in operation 940.

As such, bending of the display module 10 may be performed to correspond to any one of a plurality of booting steps.

Figure 26:
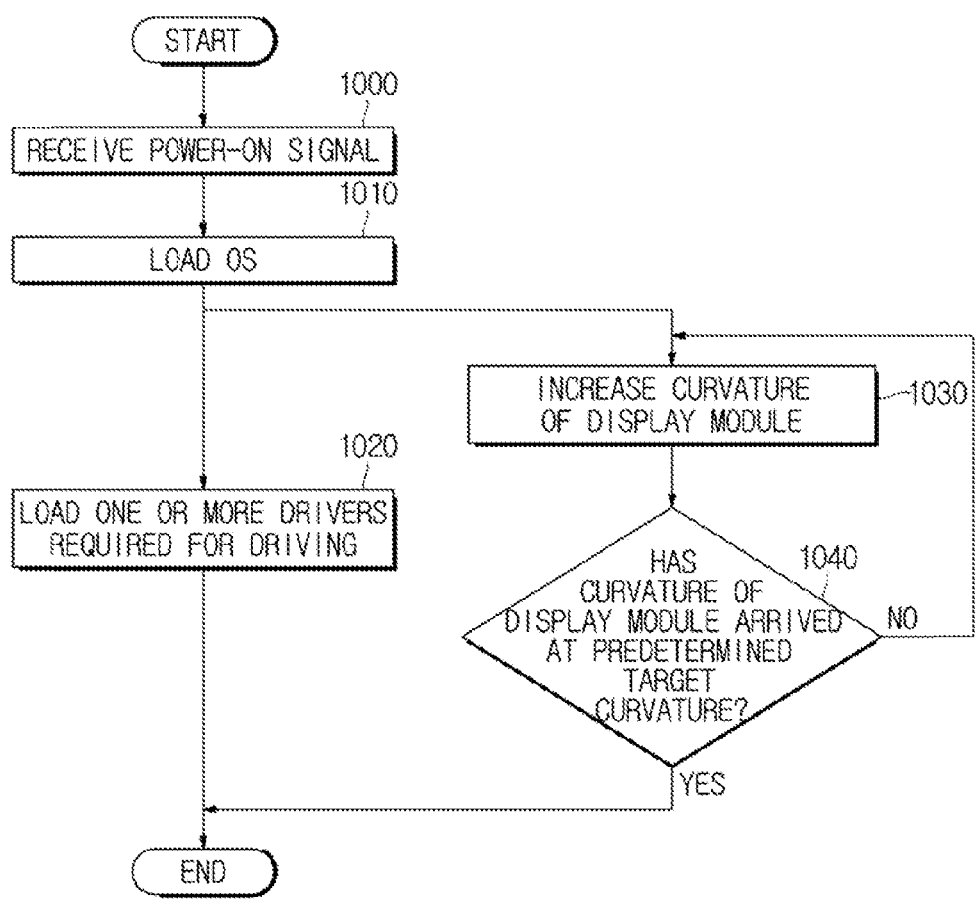
FIG. 26 is a flowchart illustrating another example of the method of FIG. 22 according to another exemplary embodiment.

FIG. 26 is a flowchart illustrating the method of FIG. 22 according to another exemplary embodiment. In the example of FIG. 26, it is assumed that booting is performed according to a booting sequence of (1) loading an OS and (2) loading one or more drivers for driving the display apparatus.

Referring to FIG. 26, power is applied to the display apparatus 1, in operation 1000. For example, the input unit 400 may receive a power-on command from a user.

In response to the power-on command received from the user, the display apparatus 1 may perform booting. For example, the display apparatus 1 may perform booting according to a predetermined booting sequence.

More specifically, an OS is loaded, in operation 1010. If loading the OS and bending of the display module 10 are completed, one or more drivers for normally driving the display apparatus 1 are loaded, in operation 1020.

When booting is performed according to the booting sequence, the curvature of the display module 10 is gradually increased, in operation 1030. In the example of FIG. 26, bending is performed while a driver is being loaded.

When the curvature of the display module 10 increases gradually, a determination is made as to whether the curvature of the display module 10 has arrived at a predetermined target curvature, in operation 1040.

If the curvature of the display module 10 has not arrived at the predetermined target curvature, the curvature of the display module 10 may continue to be increased. However, if the curvature of the display module 10 has arrived at the predetermined target curvature, bending may be completed.

In the examples of FIGS. 25 and 26, bending is performed at different respective booting steps. However, unlike the examples of FIGS. 25 and 26, bending may be performed to correspond to a plurality of booting steps, or bending may begin at an arbitrary booting step.

As such, because bending of the display module 10 may be performed according to a predetermined setting during booting, design freedom can be increased.

In the examples of FIGS. 24, 25, and 26, it is assumed that the booting sequence does not include steps of loading a BIOS, initializing hardware of the display apparatus 1, and loading of a bootloader. However, the embodiments of FIGS. 24, 25, and 26 may include one or more of these steps or other additional steps.

Figure 27:
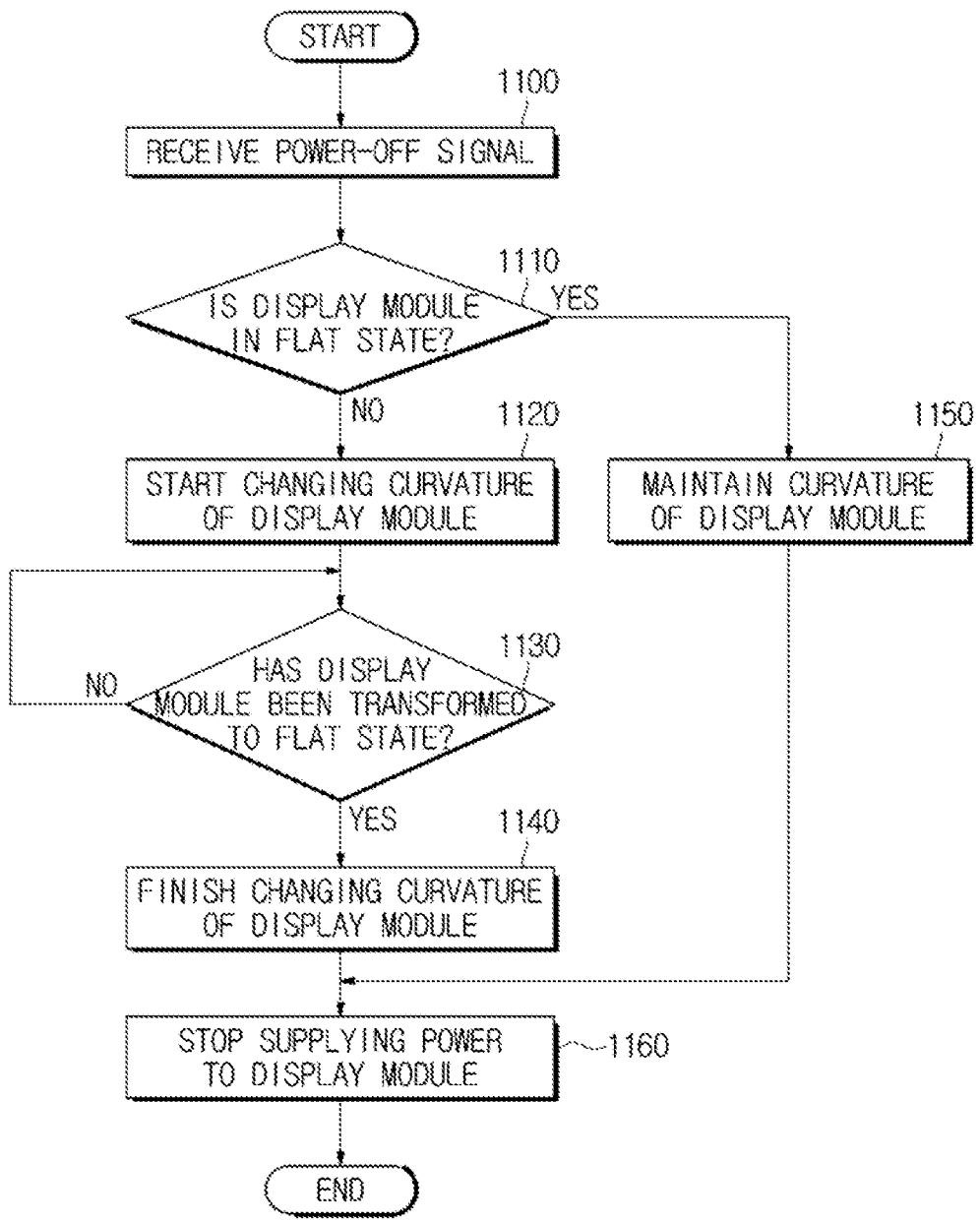
FIG. 27 is a flowchart illustrating a method of controlling a display apparatus when a power-off signal is received, according to an exemplary embodiment.

FIG. 27 is a flowchart illustrating a method of controlling the display apparatus 1 when a power-off signal is received, according to an exemplary embodiment.

First, a power-off signal is received, in operation 1100. For example, if a user inputs a power-off command through the input unit 400, the input unit 400 may transfer a power-off signal to the display apparatus 1 according to the power-off command received from the user. When the power-off signal is received, a determination is made as to whether the display module 10 is in a flat state, in operation 1110.

If the display module 10 is determined to be in a curved state, a curvature of the display module 10 is changed, in operation 1120. Thereafter, a determination is made as to whether the display module 10 has been transformed to a flat state, in operation 1130. If the display module 10 has not been transformed to the flat state, the curvature of the display module 10 may continue to change.

However, if it is determined that the display module 10 has been transformed to the flat state, the changing of the curvature of the display module 10 is completed, in operation 1140.

Meanwhile, if it is determined in operation 1110 that the display module is in the flat state, the curvature of the display module 10 is maintained, in operation 1150.

If it is determined that the display module 10 has been transformed to the flat state or that the display module 10 is in the flat state, power supplied to the display module 10 is stopped, in operation 1160.

As such, when a user inputs a power-off command, the display module 10 may be automatically returned to a flat state prior to the supplying of power to the display apparatus 1 being stopped.

Figure 28:
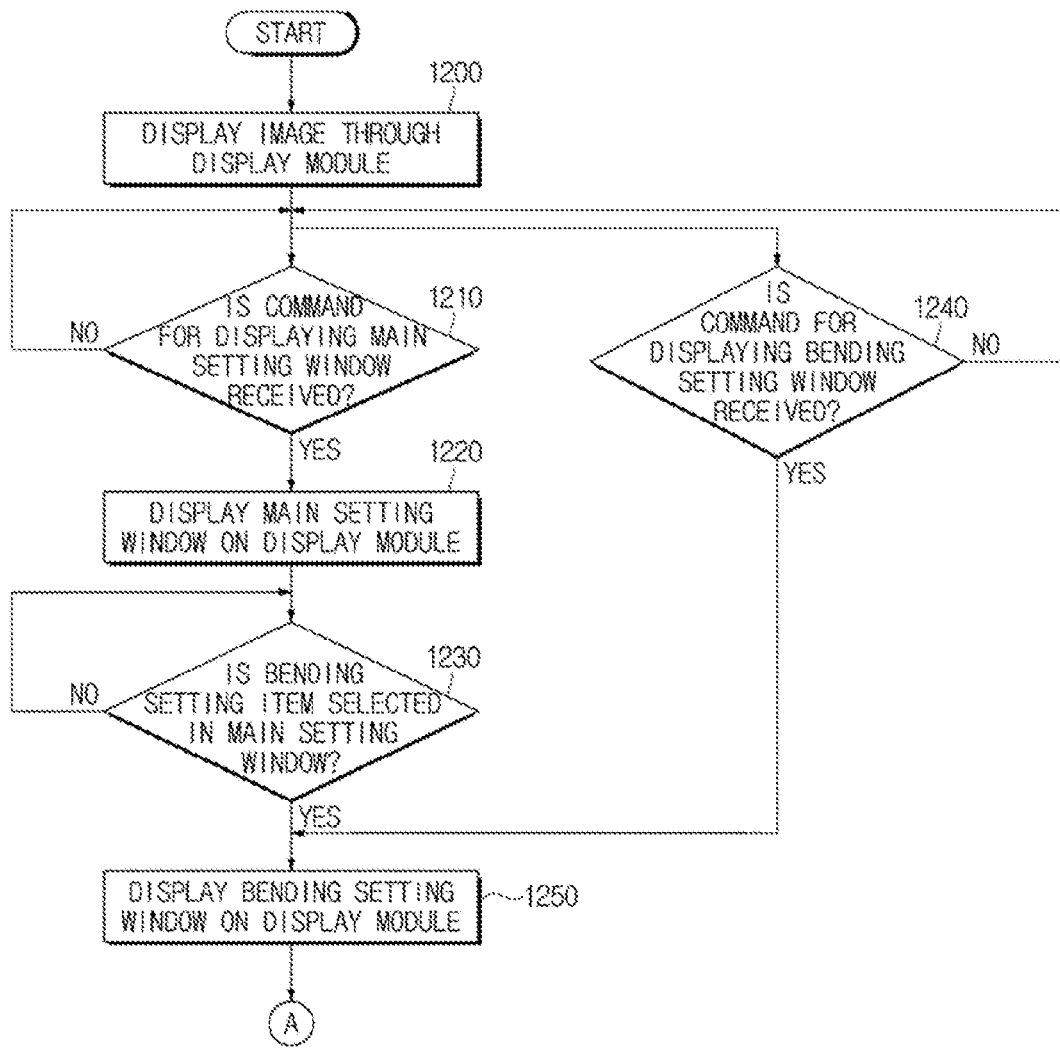
FIGS. 28 and 29 are flowcharts illustrating methods of controlling a display apparatus when images are displayed, according to an exemplary embodiment.
Figure 29:
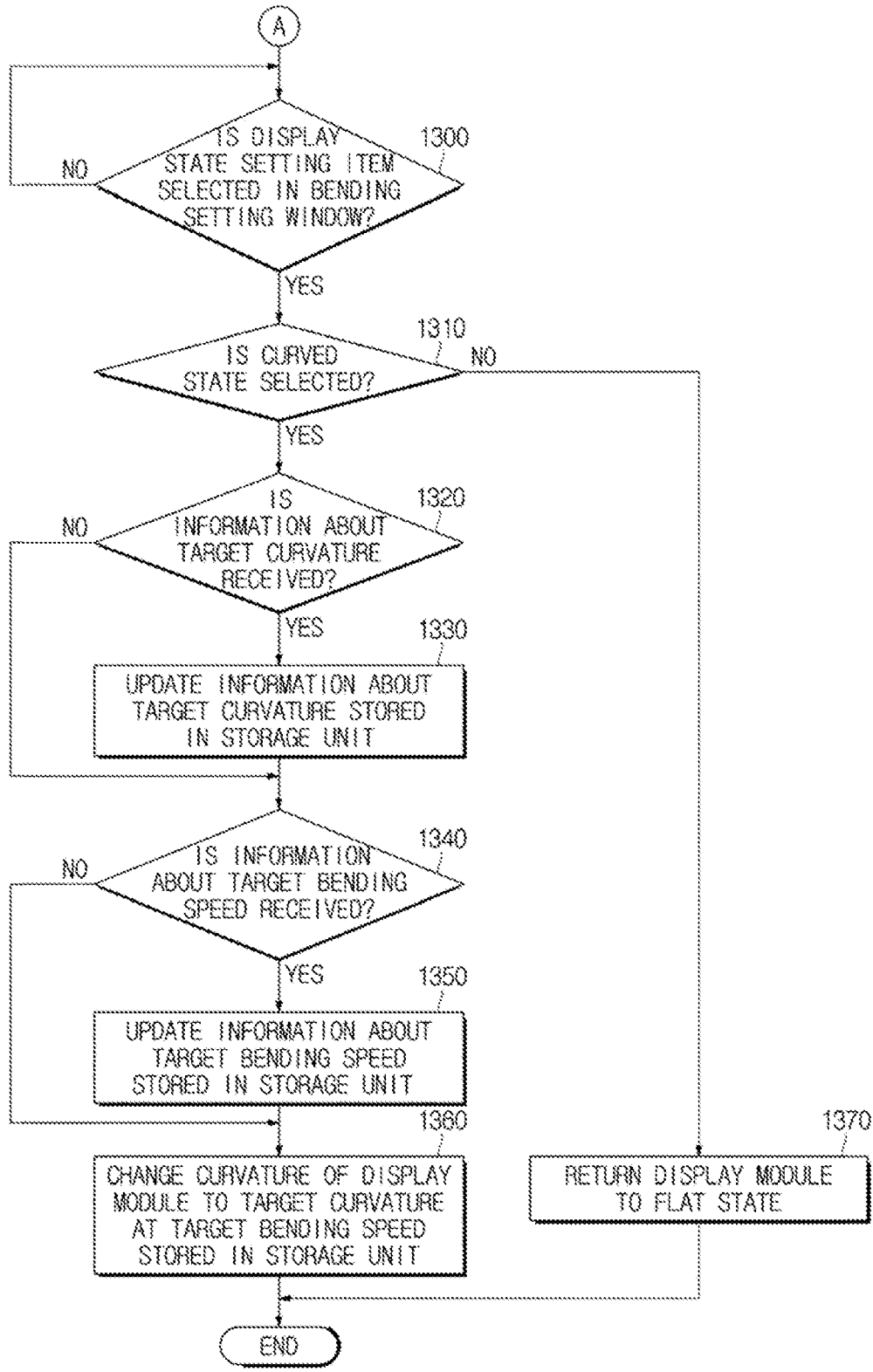

FIGS. 28 and 29 are flowcharts illustrating a method of controlling a display apparatus 1 when images are displayed, according to an exemplary embodiment.

Referring to FIG. 28, an image is displayed through the display module 10, in operation 1200. Hereinafter, an example of a method of changing a curvature of the display module 10 when images are displayed is described.

A determination is made as to whether a command for displaying a main setting window is received while images are being displayed on the display module 10, in operation 1210. At this time, a determination is also made as to whether a command for displaying a bending setting window is received, in operation 1240. If no command is received, operations 1210 and 1240 may be repeatedly performed, for example, in a loop.

If a command for displaying a main setting window is received, a main setting window is displayed on the display module 10, in operation 1220. At this time, a determination is made as to whether a bending setting item is selected in the main setting window, in operation 1230. For example, if it is determined that the bending setting item is not selected, whether the bending setting item is selected may be repeatedly determined.

If it is determined that the bending setting item is selected in the main setting window, or if a command for displaying the bending setting window is received, the bending setting window is displayed on the display module 10, in operation 1250.

Referring now to FIG. 29, a determination is made as to whether a display state setting item is selected in the bending setting window, in operation 1300. If it is determined that the display state setting item is not selected in the bending setting window, the determination as to whether the display state setting item is selected in the bending setting window may be repeatedly performed.

If it is determined that the display state setting item is selected in the bending setting window, a determination is made as to whether a curved state is selected, in operation 1310.

If it is determined that the curved state is selected by a user, it is also determined whether information about a target curvature is received, in operation 1320. If information about a target curvature is received, information about a target curvature stored in the storage unit 200 is updated to the received information about the target curvature, in operation 1330.

However, if no information about a target curvature is received after the information about the target curvature is updated, a determination is made as to whether information about target bending speed is received, in operation 1340. If information about target bending speed is received, information about the target bending speed stored in the storage unit is updated to the received information about the target bending speed, in operation 1350.

If no information about target bending speed is received after the information about the target bending speed is updated, the curvature of the display module 10 is changed to the target curvature at the target bending speed that is stored in the storage unit, in operation 1360.

If the user selects the flat state, the display module returns to the flat state, in operation 1370. As such, it is possible to easily transform the display module 10 to a flat state or a curved state even while images are displayed through the display apparatus 1.

According to an aspect of one or more exemplary embodiments, by bending the display module automatically during booting, it is possible to reduce a user's inconvenience that may be caused when the display module is bent while images are being displayed.

According to another aspect of one or more exemplary embodiments, whether to bend the display module during booting may be decided according to a user's input, therefore a user can have a wider choice of a display environment.

Although exemplary embodiments of the present disclosure have been shown and described, it should be appreciated by those skilled in the art that changes may be made in the exemplary embodiments without departing from the principles and spirit of the disclosure, the scope of which is defined in the claims and their equivalents.

What is claimed is:

1. A display apparatus comprising:
   a display;
   a receiver configured to receive a command from a user;
   a storage storing a booting sequence and a setting value;
   a bender configured to change a curvature of the display; and
   a processor configured to, in response to receiving a power-on command through the receiver, control the bender to bend the display while performing booting according to the stored booting sequence, based on the stored setting value.

2. The display apparatus according to claim 1, wherein the display comprises a self-emitting display panel.

3. The display apparatus according to claim 1, wherein the display comprises a non-emissive display panel.

4. The display apparatus according to claim 1, wherein the setting value comprises at least one of a bending speed or a target curvature.

5. The display apparatus according to claim 1, wherein the booting sequence comprises at least one of loading a Basic Input Output System (BIOS), initializing hardware of the display apparatus, loading a bootloader, executing an operating system (OS), loading a hardware driver, and executing an application.

6. The display apparatus according to claim 1, wherein the processor is configured to transmit a booting control signal to hardware corresponding to the stored booting sequence, and transmit a bending control signal for bending the display to the bender while transmitting the booting control signal to the hardware.

7. The display apparatus according to claim 1, wherein, in response to a power-off command being received through the receiver, the processor is configured to control the bender to change a curvature of the display such that the display is transformed from a curved state to a flat state prior to power to the display being stopped.

8. The display apparatus according to claim 1, wherein the processor further comprises a graphic processor configured to control the display to display a bending setting window comprising a setting for whether to change the curvature of the display.

9. A method of controlling a display apparatus, the method comprising:
   receiving a power-on command;
   in response to the power-on command being received, booting the display apparatus according to a booting sequence stored in a storage;
   determining whether to bend a display of the display apparatus during booting, based on a setting value stored in the storage; and
   in response to determining to bend the display during booting, controlling a bender of the display apparatus to bend the display.

10. The control method according to claim 9, further comprising displaying a bending setting window comprising a setting for whether to bend the display.

11. The control method according to claim 10, further comprising:
    receiving an input for setting whether to bend the display during booting, through the bending setting window; and
    storing a setting value corresponding to the input for setting whether to bend the display during booting, in the storage.

12. The control method according to claim 9, wherein the booting sequence comprises at least one of loading a Basic Input Output System (BIOS), initializing hardware of the display apparatus, loading a bootloader, executing an operating system (OS), loading a hardware driver, and executing an application.

13. The control method according to claim 9, wherein the booting comprises:
    transmitting a booting control signal to hardware corresponding to the booting sequence; and
    performing, at the hardware receiving the booting control signal, booting according to the transmitted booting control signal.

14. The control method according to claim 13, wherein the controlling of the bender comprises transmitting a bending control signal for bending the display to the bender, while transmitting the booting control signal to the hardware.

15. The control method according to claim 9, further comprising, in response to a power-off command being received, controlling the bender to change a curvature of the display such that the display is transformed from a curved state to a flat state prior to power to the display being stopped.

16. A display apparatus comprising:
    a first processor configured to control a display;
    a second processor configured to simultaneously control a booting sequence of the display apparatus and a bending operation of the display, based on a setting value in storage.

17. The display apparatus of claim 16, wherein the second processor is configured to simultaneously control the booting sequence and the bending operation such that the booting sequence and the bending operation at least partially overlap in time.

18. The display apparatus of claim 16, wherein the booting sequence comprises a plurality of booting operations, and an amount of time for the bending operation corresponds to an amount of time for at least one, but not all, of the plurality of booting operations.

19. The display apparatus of claim 16, wherein the second processor is configured to simultaneously control the booting sequence and the bending operation such that the bending operation is completed prior to or at the same time as the booting sequence.

20. The display apparatus of claim 16, wherein the second processor is configured to simultaneously control the booting sequence and the bending operation to start, in response to receiving a power-on command for the display apparatus.

* * * * *